United States Patent
Plummer

(10) Patent No.: US 11,640,498 B2
(45) Date of Patent: May 2, 2023

(54) METHOD AND SYSTEM FOR SELECTIVE DOCUMENT REDACTION

(71) Applicant: Document Corporation IP Unit Trust, Victoria (AU)

(72) Inventor: Andrew Leonard Plummer, Victoria (AU)

(73) Assignee: DOCUMENT CORPORATION IP UNIT TRUST, Albert Park (AU)

( * ) Notice: Subject to any disclaimer, the term of this patent is extended or adjusted under 35 U.S.C. 154(b) by 263 days.

(21) Appl. No.: 15/321,854

(22) PCT Filed: Jun. 19, 2015

(86) PCT No.: PCT/AU2015/000361
§ 371 (c)(1),
(2) Date: Dec. 23, 2016

(87) PCT Pub. No.: WO2016/000015
PCT Pub. Date: Jan. 7, 2016

(65) Prior Publication Data
US 2017/0132186 A1     May 11, 2017

Related U.S. Application Data

(60) Provisional application No. 62/020,248, filed on Jul. 2, 2014.

(51) Int. Cl.
*G06F 40/197*     (2020.01)
*G09C 1/00*     (2006.01)
(Continued)

(52) U.S. Cl.
CPC ............ *G06F 40/197* (2020.01); *G06F 16/93* (2019.01); *G06F 21/10* (2013.01);
(Continued)

(58) Field of Classification Search
None
See application file for complete search history.

(56) References Cited

U.S. PATENT DOCUMENTS 7,130,858 B2    10/2006   Ciaramitaro et al.
7,805,673 B2    9/2010   Der Qualeler et al.
(Continued)

OTHER PUBLICATIONS

Intention to Grant to European Application No. 15 814 887.4-1213, dated Apr. 28, 2021.
(Continued)

*Primary Examiner* — Howard Cortes
(74) *Attorney, Agent, or Firm* — Barnes & Thornburg LLP

(57) ABSTRACT

A computer implemented method of selectively controlling redacted content from an electronic document having one or more pages is provided. The method includes providing a file record associated with the electronic document and one or more page records within the file record. Each page record corresponds to the one or more pages in the electronic document. For each page with redacted content, one or more redacted page image records are provided and each redacted page image record is associated with an authorization level. The one or more page records are selectively displayed and the one or more redacted page image records are selectively displayed based on the authorization level associated with a user viewing the electronic document.

26 Claims, 44 Drawing Sheets

(51) Int. Cl.
  *G06F 21/10* (2013.01)
  *G06Q 10/10* (2023.01)
  *G06F 16/93* (2019.01)
  *G06F 21/62* (2013.01)
  *G06F 40/166* (2020.01)
  *H04L 9/40* (2022.01)

(52) U.S. Cl.
  CPC ...... *G06F 21/6218* (2013.01); *G06F 21/6227* (2013.01); *G06F 40/166* (2020.01); *G06Q 10/10* (2013.01); *G09C 1/00* (2013.01); *H04L 63/105* (2013.01); *G06F 2221/2141* (2013.01)

(56) References Cited

U.S. PATENT DOCUMENTS

| | | | | |
|---|---|---|---|---|
| 10,043,218 | B1* | 8/2018 | Sabbah | G06Q 40/00 |
| 2004/0044894 | A1* | 3/2004 | Lofgren | G06T 1/0028 |
| | | | | 713/176 |
| 2005/0004951 | A1* | 1/2005 | Ciaramitaro | G06F 16/93 |
| 2005/0063612 | A1 | 3/2005 | Manber et al. | |
| 2005/0161512 | A1* | 7/2005 | Jones | B41M 3/144 |
| | | | | 235/487 |
| 2006/0290136 | A1* | 12/2006 | Alasia | G07D 7/128 |
| | | | | 283/72 |
| 2007/0030528 | A1* | 2/2007 | Quaeler | G06F 16/33 |
| | | | | 358/453 |
| 2009/0019379 | A1* | 1/2009 | Pendergast | G06F 16/93 |
| | | | | 715/762 |
| 2009/0025063 | A1* | 1/2009 | Thomas | G06F 21/6218 |
| | | | | 726/4 |
| 2009/0070376 | A1* | 3/2009 | Eom | G06F 40/169 |
| 2009/0196529 | A1* | 8/2009 | Su | G06Q 10/10 |
| | | | | 382/306 |
| 2009/0323087 | A1 | 12/2009 | Luo | |
| 2009/0327294 | A1* | 12/2009 | Bailor | G06F 17/24 |
| 2010/0033753 | A1* | 2/2010 | Stephenson | G06F 3/0486 |
| | | | | 358/1.15 |
| 2010/0211796 | A1* | 8/2010 | Gailey | G06F 21/31 |
| | | | | 713/182 |
| 2011/0119571 | A1* | 5/2011 | Decker | G06F 16/9574 |
| | | | | 715/205 |
| 2012/0110472 | A1* | 5/2012 | Amrhein | G06F 16/954 |
| | | | | 715/753 |
| 2012/0331571 | A1 | 12/2012 | Vandervort | |
| 2013/0007123 | A1* | 1/2013 | Crosbie | H04L 63/107 |
| | | | | 709/204 |
| 2013/0159416 | A1* | 6/2013 | Hirabayashi | H04L 65/403 |
| | | | | 709/204 |
| 2017/0132186 | A1* | 5/2017 | Plummer | G06F 21/6227 |

OTHER PUBLICATIONS

Examination Report No. 4 for AU Application No. 2015283798 dated Aug. 2, 2021 (7 pages).

* cited by examiner

METHOD AND SYSTEM FOR SELECTIVE DOCUMENT REDACTION

This application is a U.S. national phase application of International Patent Application no. PCT/AU2015/000361 filed on Jun. 19, 2015, which claims the benefit of U.S. Provisional Patent Application No. 62/020,248 filed Jul. 2, 2014.

TECHNICAL FIELD

The present invention relates to a computer implemented method and system for the selective redaction of content from electronic documents based on a user's level of authorization.

BACKGROUND OF INVENTION

Document control plays an important role in many organizations. Electronic documents, and in particular Portable Document Format (PDF) files are widely used, but control of the content and dissemination of the information contained in PDF's is problematic. The electronic document is typically a PDF formatted file but need not be, it could be any type of file.

Presently PDF access can only be given on an 'all or nothing' basis as PDFs are pre-set to display in entirety. Current approaches do not work very effectively—today's institutions have to rely heavily on 'human honor' as a security means, not to disclose privileged pages inadvertently encountered. Further, this arrangement is not practical when dealing with large volumes of PDF documents (in government departments, for example) and it still leaves the privileged content vulnerable elsewhere.

A problem arises when parts of a PDF document contain privileged content. The PDF design makes it very difficult to protect those privileged parts from different groups of users, necessitating the need to create a static marked up or redacted versions of the PDF for these different groups. This requires a master copy, minus those privileged parts obliterated to prevent any reverse engineering risks. Therefore there is no ability to undo selected parts of the redaction as the need for change is received. This is not optimal. A complete repeat of the process is required each and every time there is a change. As well as being time consuming, this duplication step also means privileged content still remains at risk elsewhere.

Presently, there exists software platforms such as identity manager software platforms and digital rights management (DRM) software platforms from a range of vendors which provide two settings—deny access or grant access to the entire PDF file record. This is not optimal where one page of a PDF document only requires censorship but by default access to the entire PDF is denied. Correspondingly this is not optimal where one page of a PDF document only requires censorship but by default access to the entire PDF is granted.

Attempts have been made at real-time/dynamic redaction but they are generally slow when multiple words and multiple pages need redacting in real-time, and generally does not account for redacting graphics or images or individualistic pages.

Further, at present, there is no way to warn a reader of the original/master document that some of those pages have been censored. This is not optimal as the potential exists for the unintended release of sensitive information.

Presently, when dealing with large volumes of PDF documents (in government departments, for example) many diverse programs have been used to generate PDF records. With this diversity and along with the complex nature of some PDF documents, software systems cannot expect that this collection of mixed PDFs will be generated according to the PDF format rules, structures and page layout algorithms. While software platforms exist which attempt to perform redaction on the native PDF database file, this approach (a database redaction method) is difficult and risky to codify to this degradation condition along with those systems that may convert a PDF file to an internal 3rd party proprietary format. Ensuring the preservation of and access to the PDF record together with the authenticity in a digital environment is complicated by the fact that the preservation of PDF pages will always entails some form of binary level transformation using these database redaction methods—in this archival context. As a result, it is not always clear how to handle this degradation condition programmatically and some information may be lost or distorted during the process of this redaction.

Presently, there is no way to selectively censor privileged information from within the same PDF file from some users (and not others) without creating duplicate role based PDF file records which is not optimal and is a hindrance to effective protection of privileged content.

It would therefore be desirable to provide a system and method which ameliorates or at least alleviates the above problems.

Before turning to a summary of the present invention, it will be appreciated that the discussion of the background to the invention is included to explain the context of the invention. This is not to be taken as an admission that any of the material referred to was published, known or part of the common general knowledge.

SUMMARY OF INVENTION

According to a first aspect, the present invention provides, a computer implemented method of selectively controlling redacted content from an electronic document having one or more pages, including the steps of: providing a file record associated with the electronic document; providing one or more page records within the file record, each page record corresponding to the one or more pages in the electronic document; for each page with redacted content, providing one or more redacted page image records, each redacted page image record being associated with an authorization level; and selectively displaying the one or more page records and the one or more redacted page image records based on the authorization level associated with a user viewing the electronic document. The electronic document is typically a PDF formatted file but need not be, it could be any type of file.

Preferably, the one or more page records and the one or more redacted page image records are retrieved and displayed dynamically in response to a user request. The authorization level associated with a user viewing the electronic document is initiated by a URL call to open a nominated PDF document that confers with an identity manager module to establish a user authorization level so the appropriate PDF document can be assembled. It will be appreciated that the URL may be unique to the particular user, or may be unique to the particular document or page, or a combination of the user and document.

Advantageously the present invention censors and redacts information from pages of an electronic document before it is displayed and based on a user authorization level. The authorization level may be viewed as "vertical" levels of authorization (in hierarchical sense) for example, documents within a particular organization may include levels like, protected, confidential, secret, top secret and the like. Authorization levels may also include "horizontal" levels of authorization (in a ring-fencing sense) (for example, where government departments need to share the same document with different agencies, and they have a need to censor or redact each document differently according to different levels of authorization, or ensure regulatory compliance with Interagency and Intergovernmental Information sharing frameworks.

Authorization level may also include a geographic limitation and legal jurisdiction boundaries also, but need not be, it could be any type of boundary classification. Advantageously, the present invention can selectively personalize a PDF, so that only the information that is authorized is seen. For example, the same PDF record can be opened by different groups of people and some of those pages selectively may contain a different level of censorship.

Preferably, the authorization level associated with a user viewing the electronic document is determined via an identity manager module.

The redacted content may be stored in a database based at an authorization level associated with a page record.

Each of the one or more redacted page image records are pre-computed and stored in a database. Each of the one or more redacted page image records includes a high resolution copy and a low resolution copy of the redacted page image records to display.

Advantageously, the present invention performs redaction of a page using an image format, which is the most appropriate preservation strategy. The image format retains the visual appearance of the original page record. The purpose of this preservation is to ensure that the page remains accessible in such a way that they can be considered authentic and reliable evidence. Redaction mark-up coordinates may be stored in a database and selectively drawn over the page image and merged to produce the redacted page image. The redacted page image is then saved as a PDF formatted file.

Advantageously, the present invention manages a PDF electronic record exactly once as the primary master source file record and is stored in a database. Advantageously the redaction and censorship method can be adjusted as the need for change is received and this method prevents any reverse engineering risks, meaning privileged content can remain selectively protected from different authorization levels using a computerized method. Thus, when any such redaction and censorship adjustments are made, this update propagates to the enterprise at large in real-time, without the possibility of a duplicate PDF somewhere in the distant enterprise not being updated (because there would be no duplicate PDFs that needed updating).

In a further advantage, should a page need to be moved to a separate PDF file record schema or to change the page sort order, moving a page transfers all the associated page data (e.g. censorship and redaction data, thumbnail images, overlay data, authorization level) enabling users of the system to easily correct paperwork errors.

A thumbnail image of each redacted page image record and each page record may be provided, the thumbnail being associated with an authorization level. Each of the page record thumbnail images and the one or more redacted page image record thumbnail images are preferably pre-computed and stored in a database.

Advantageously, pre-computed pages are assembled according to authorization levels and page-ordering in real-time and are pre-prepared using background processes. This approach means infinitely large PDF files with lots of redactions can be selectively compiled very quickly and displayed according to any authorization level.

Preferably, each thumbnail image is associated with a URL which points to a full resolution version of the page and is associated with an authorization level.

A thumbnail image of each page record and the one or more redacted page image records may be provided, the thumbnail being associated with an authorization level. Preferably, the thumbnail image of each page record or redacted page image record is selectively displayed based on the authorization level associated with a user when search results are returned allowing page thumbnail visualization and navigation efficiencies. Preferably, each of the page record thumbnail images and the one or more redacted page image record thumbnail images are pre-computed and stored on a database.

The method may further include the step of accessing the database and selectively displaying the page record thumbnail image and the one or more redacted page image record thumbnail images based on the authorization level associated with a user.

The method may further include the step of accessing and selectively displaying the thumbnail image of each redacted page image record based on the authorization level associated with a user viewing the electronic document.

Overlay data may be provided on the one or more page records and the one or more redacted page image records in real time. The overlay data may include, a notification of currency of the page record or redacted page record image, one or more indicia for visible for display on a screen, one or more indicia visible for printing one or more indicia visible for display on a screen and printing, page censorship alerts or page substitution alerts.

The overlay data may further include censorship alerts indicia on the page record or on the one or more redacted page image records.

The method may further include the step of providing a notification of currency indicia on the page record or on the one or more redacted page image records or one or more indicia for visible for display on a screen, one or more indicia visible for printing, one or more indicia visible for display on a screen and printing.

The method may further include the step of providing a serialization and personalization indicia on the page record or on the one or more redacted page image records.

The method may further include the step of providing page substitutions of the page record or of the one or more redacted page image records which replaces the entire page from an authorization level. For example where a sensitive keyword maybe found on a page but is being withheld from viewing or printing maybe due to censorship reasons and is replaced with a substituted page.

Preferably, the overlay data is stored in a database, based on the authorization level associated with a page record.

The method may further include the step of applying an optical character recognition (OCR) process on one or more page records and one or more redacted page image records.

Preferably, where content within a page image record is to be redacted, a striping arrangement is provided on the redacted page image record. Since machine and human redacted information thought to be redacted, can in some cases be successfully recovered via a combination of manual effort and document image analysis techniques, the present invention, by varying the shape of the redaction randomly or when the same redacted phrase is encountered, reduces the effectiveness of these document image analysis techniques.

The method of the invention may further include the step of modifying the boundary cell obfuscation arrangement provided on the redacted page image record. Advantageously, the boundary cell obfuscation arrangement is not permanent and may be changed over time as required.

Content within a page image record may be redacted or permission may granted or denied to the original source file object(s) based on the redaction authorization level set within the entire document. Preferably, the authorization level is the uppermost level unless set otherwise. For example, if a document has portions redacted, access to the source document will be restricted and so too will any related versions (i.e. any version of the document at any other level of authorization) of the document. In the event the source document has its redaction removed, this change will be propagated to the related versions (i.e. any version of the document at any other level of authorization) of the document.

BRIEF DESCRIPTION OF DRAWINGS

The invention will now be described in further detail with reference to the accompanying drawings. It is to be understood that the particularity of the drawings does not supersede the generality of the preceding description of the invention.

DETAILED DESCRIPTION

Figure 1:
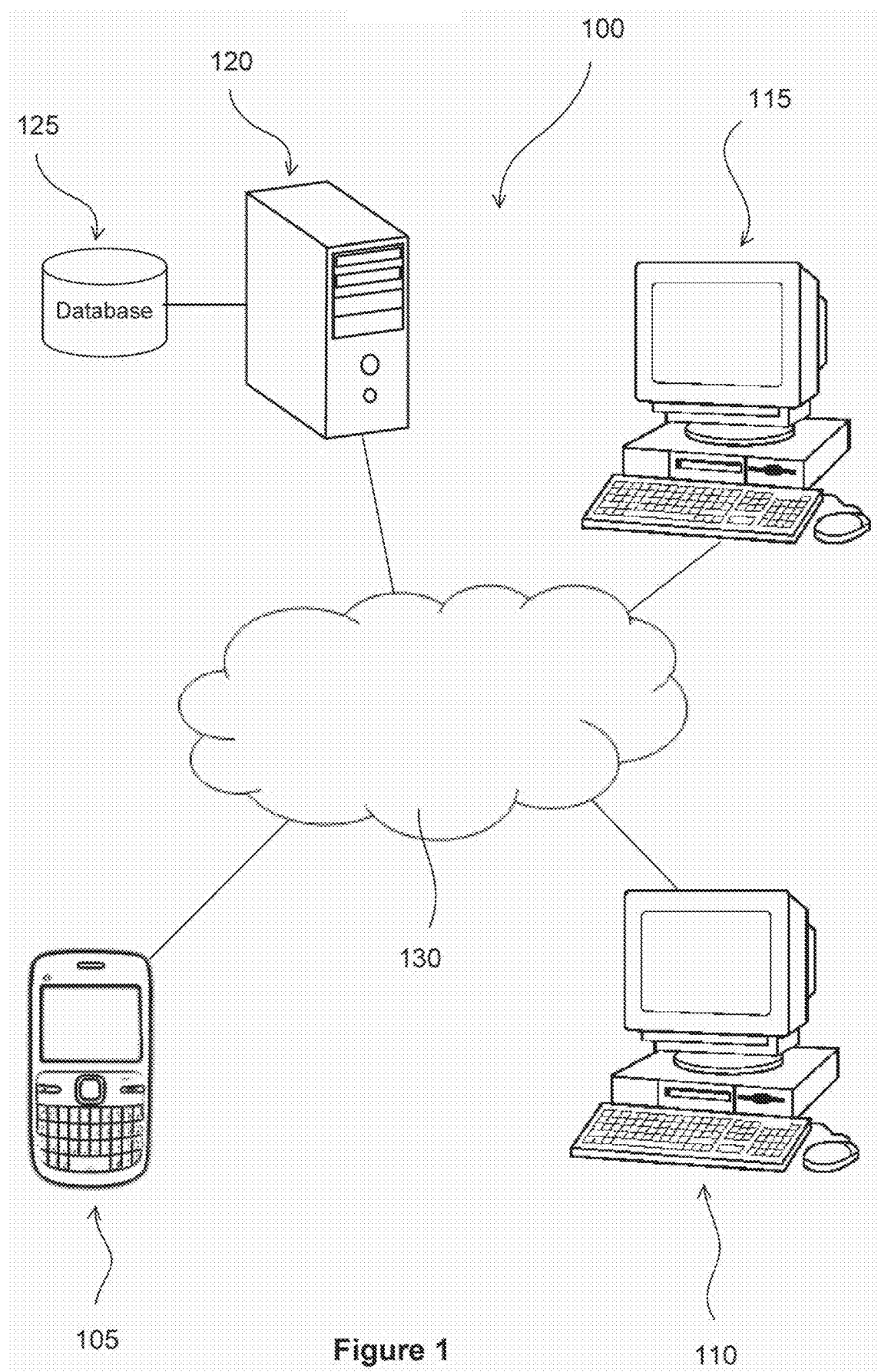
FIG. 1 is a schematic diagram of an example network that can be utilized to give effect to a method and system according to an embodiment of the invention.

Embodiments of the present invention can be realized over a network 130, an example of which is shown in FIG. 1.

The system 100 of the present invention may run on a network 130 which includes one or more electronic devices 105, 110, 115 and one or more servers 120. Further, the system 100 of the present invention may run in software on one or more electronic devices 105, 110, 115 and/or one or more servers 120. In this example, the electronic devices include one or more mobile communication devices 105 and one or more personal computers (PCs) 110, 115. The server 120 is connected to a database 125. The electronic device 105, personal computer 110 server 120 are connected via a network 130 such as the internet.

The transfer of information and/or data over the network can be achieved using wired communications means or wireless communications means. It will be appreciated that embodiments of the invention may be realized over different networks, such the internet or LAN (local area network). Also, embodiments need not take place over a network, and the method steps could occur entirely on a client or server processing system.

Example of a Processing System

Figure 2:
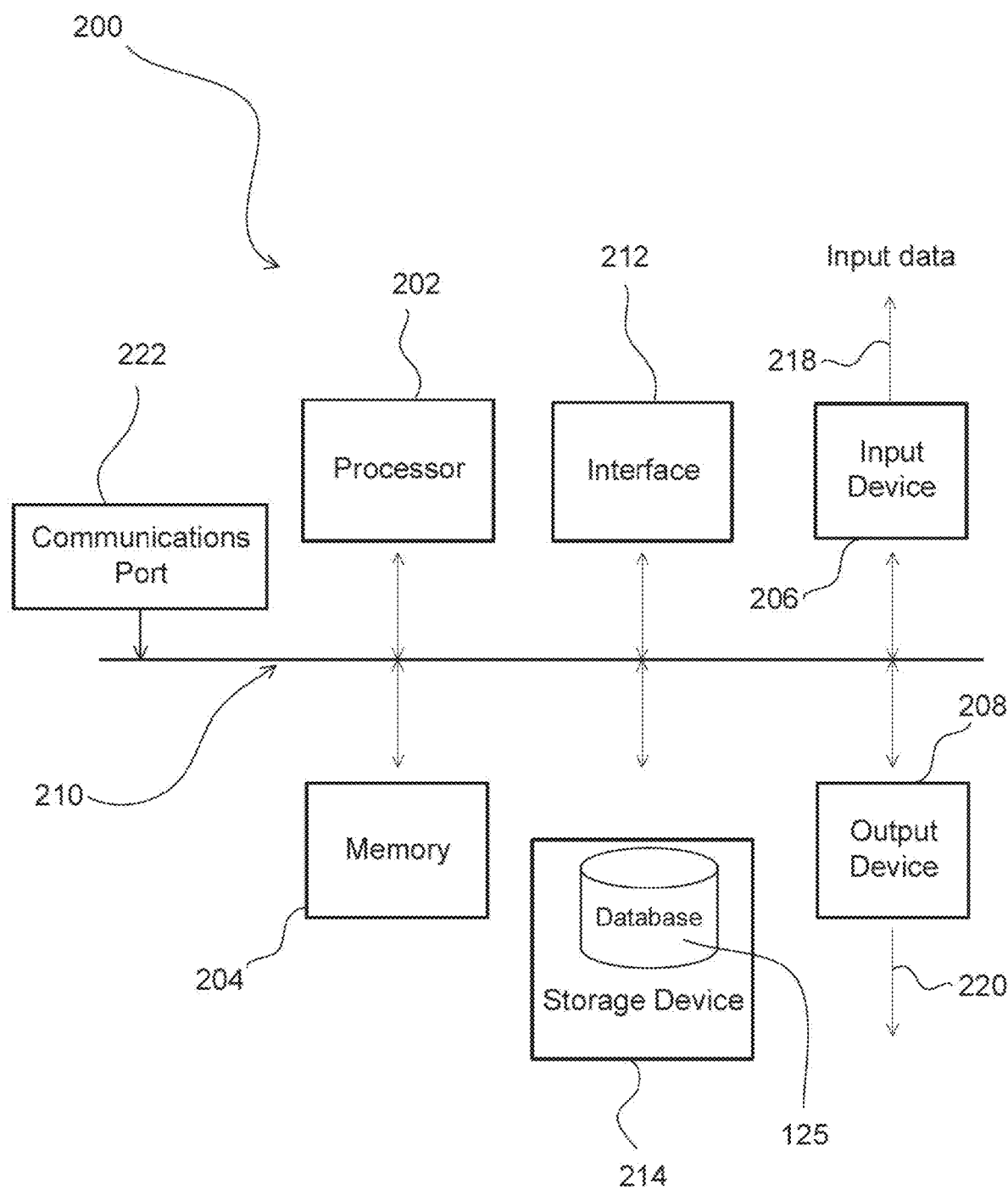
FIG. 2 is a functional block diagram of an example processing system that can be connected to the network.

The mobile communication device 105, personal computer 110, 115 and server 120 may include a processing system 200 shown in FIG. 2.

The processing system 200 includes a processor 202 (or processing unit), a memory 204, at least one input device 206, at least one output device 208 and a communications port 222. As is shown, the processor 202, memory 204, input device 206, output device 208 and communications port 222 are typically coupled together via a bus or group of buses 210. In certain embodiments, input device 206 and output device 208 may be the same device such as in the case of, for example, a computer graphics display or handheld device such as an tablet or mobile communication device that incorporates a touch-screen.

An interface 212 can also be provided for coupling the processing system 200 to one or more peripheral devices. For example interface 212 may include a PCI card or PC card. At least one storage device 214 which houses at least one database 125 can also be provided.

The memory 204 may include any suitable memory device and including, for example, volatile or non-volatile memory, solid state storage devices, magnetic devices, etc. The memory 204 may typically store an operating system that provides functionality to the processing system 200. A file system and files are also typically stored on the storage device 214 and/or the memory 204. The memory 204 may also include one or more software applications or program data.

The applications running in memory 204 may include a web browser or application suitable application for displaying electronic documents for reading or reviewing and accessing the internet 130 to carry out the method and system of the present invention.

The processor 202 may include more than one processing device, for example to handle different functions within the processing system 200. Input device 206 receives input data 218 and may include, for example, a keyboard, a pointer device such as a pen-like device or a mouse, a touch-screen, audio receiving device for voice controlled activation, such as a microphone, data receiver or antenna such as a modem or wireless data adaptor, data acquisition card, etc. The input device 208 may be operable by a user to enter input data 218, or it may receive data from another input data source. Thus, the input data 218 may be provided by different input devices 206. For example, in an embodiment the input data 218 may include keyboard or mouse instructions entered by a user, in conjunction with data received via a network.

Preferably, the input device 208 includes a touch screen associated with an electronic communication device.

Output device 208 produces or generates output data 220. In one embodiment, the output device 208 includes a display device (such as a computer graphics display) for providing output data 220 in a visual form. In another embodiment, the output device 208 includes a display device or monitor together with a set of audio speakers in which case the output data 220 may be provided in an audio-visual form.

It will be appreciated that other types of output devices 208 may also be used, such as, a port (for example a USB port), a peripheral component adaptor, a data transmitter or antenna such as a modem or wireless network adaptor, etc.

It will also be appreciated that the output data 220 could be output from a variety of different output devices 208 such as, for example, a visual display on a monitor in conjunction with data transmitted to a network. In such an embodiment a user may view data output, or an interpretation of the data output, on, for example, a monitor or using a printer.

The storage device 214 can include any form of data or information storage means, for example, volatile or non-volatile memory, solid state storage devices, magnetic devices, etc.

The communications port 222 allows the processing system 200 to communicate with other devices via a hard wired or wireless network, such as network 130 in FIG. 1.

In use, the processing system 200 can be adapted to allow data or information to be stored in and/or retrieved from, via wired or wireless communication means, the at least one database 125. The interface 212 may allow wired and/or wireless communication between the processing unit 202 and peripheral components that may serve a specialized purpose. The processor 202 may receive instructions as input data 218 via input device 206 and can display processed results or other output to a user by utilizing output device 208. Multiple input devices 206 and/or output devices 208 can be provided.

It should be appreciated that the processing system 200 may be any form of terminal, server processing system, specialized hardware, computer, computer system or computerized device, personal computer (PC), mobile or cellular telephone, mobile data terminal, portable computer, Personal Digital Assistant (PDA), pager or any other similar type of device.

The present invention is a system 100 in which a user associated with personal computer 115 may selectively control content on one or more electronic documents and store them in database 125 on server 120. The content may be controlled by redaction of content on pages or by making certain pages or documents unavailable to certain users. When users associated with mobile device 105 or personal computer 110 access the one or more PDF documents, the PDF document that is selectively displayed to them is dependent on their authorization level access rights to the document.

Figure 3:
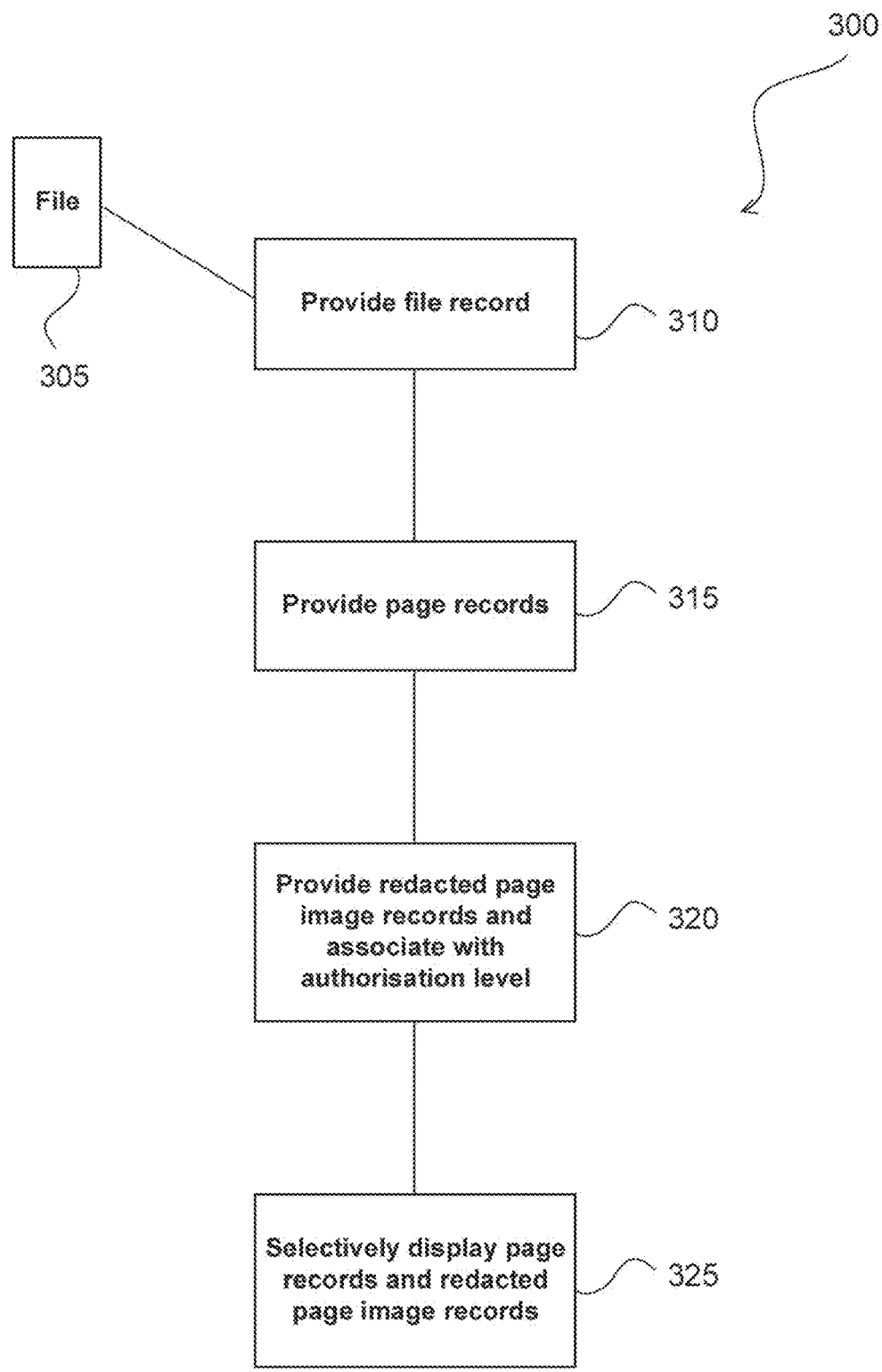
FIG. 3 is a flow diagram illustrating an example method of the invention.

FIG. 3 is a flow diagram illustrating a method 300 of the invention for selectively controlling redacted content from electronic document 305 having one or more pages. The electronic document 305 is typically a PDF formatted file but need not be, it could be any type of file. At step 310 a file record is created or appended which is associated with the electronic document 305. Control then moves to step 315 in which one or more page records are provided within the file record. Each of the page records corresponds to the one or more pages in the electronic document 305 which is stored on the system 100 via database 125. Control then moves to step 320 in which for each page with content to be redacted, one or more redacted page image records are provided. Each redacted page image record is associated with a particular authorization level which is stored on the system 100 via database 125. Control then moves to step 325 in which one or more page records and one or more redacted page image records are selectively assembled in page-ordering and the now virtual PDF document is displayed to a user based on the authorization level associated with a user viewing the document.

Figure 4:
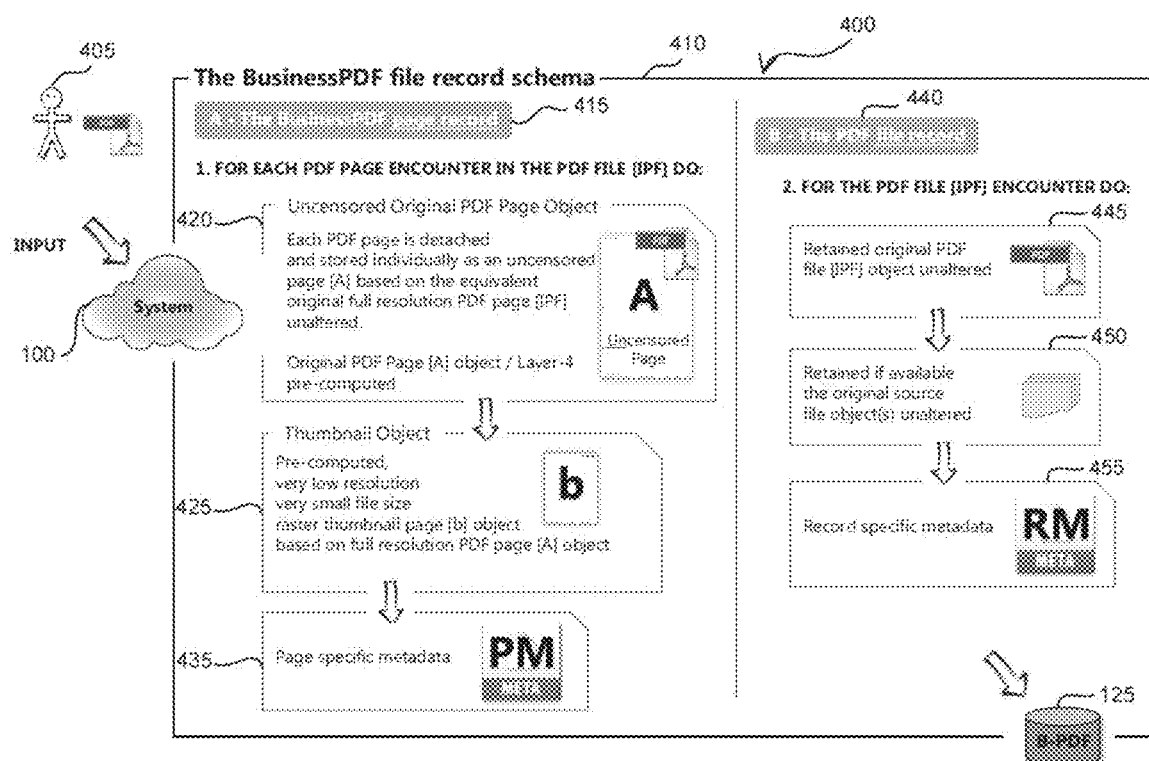
FIG. 4 is a schematic diagram of a PDF file record schema according to the invention.

FIG. 4 is a schematic diagram 400 of a PDF file record schema showing PDF file importation and processing. The PDF file record schema 410 is created or appended (i.e. pages can be added to a pre-existing file record schema) by the system 100 and receives an input file 405 typically in the form of a PDF with multiple pages (none of which have been redacted or censored in any way). The PDF file record schema 410 includes a PDF page record 415 and a PDF file record 440. The PDF page record 415 is a version of the imported PDF file 405 which has been split into individual pages 420 and thumbnails 425 created. An uncensored original PDF page object 420 is provided. The uncensored original PDF page object 420 has each PDF page detached and stored individually as an uncensored page based on the equivalent original full resolution PDF page as it exists (i.e. unaltered).

Also created is a thumbnail object 425 which is pre-computed in low resolution (i.e., in a very small file size). Typically it is a raster thumbnail object based on the full resolution PDF page object 420. Page specific metadata 435 may also be provided and ultimately stored. Page specific metadata 435 may include, for example: a page object identifier, page latitude and longitude coordinates, page coverage identifier, page checksum like value, page configuration identifier, authorization level, resolution of page value, page content type, page order value, page thumbnail object identifier, document object identifier, page title, page remark data, page status, page alerts, page currency, date of creation, page file size, redact edit flag, redact status, server based rendering trigger, sync key identifiers and the like.

The image of the uncensored original PDF page object 420, thumbnail object 425 and page specific metadata 435 are stored in a database 125 associated with server 120. The PDF file record 440 is also stored in a database 125 and includes a retained original PDF file Import PDF File [IPF] 445 relating to the imported PDF File 405.

If it exists, the original source file objects are retained at 450. Original source file objects may include Microsoft Office formatted files, Word Documents, Excel spreadsheets, PowerPoint presentations or CAD drawing formatted files DWG, DGN, or IMAGE formats TIFF, JPEG and the like. Record specific metadata 455 is also recorded. Record specific metadata 455 may include, for example: File record schema identifier, Document object identifier, Foreign document object identifier, Document latitude and longitude coordinates, Document Coverage identifier, Original PDF file [IPF] document checksum like value, Original PDF file [IPF] object identifier, original source file object identifiers, document configuration identifier, document title, document remark data, version, owner of the document, author, date of creation, date indexed, status, sync key identifier and the like.

During importation a series of checksum like values may be calculated for each page 420 and for the Original PDF file [IPF] 445 and stored in database 125. In operation, checksum like values are generated during an import of the file 405 and these values are compared against stored checksum like values in the database 125. When these checksum like values match, a process may execute to prevent page duplicates from being imported thereby avoiding 'polluting' data within a particular file record schema 410 or used in helping to detect similar pages during searching.

Figure 5:
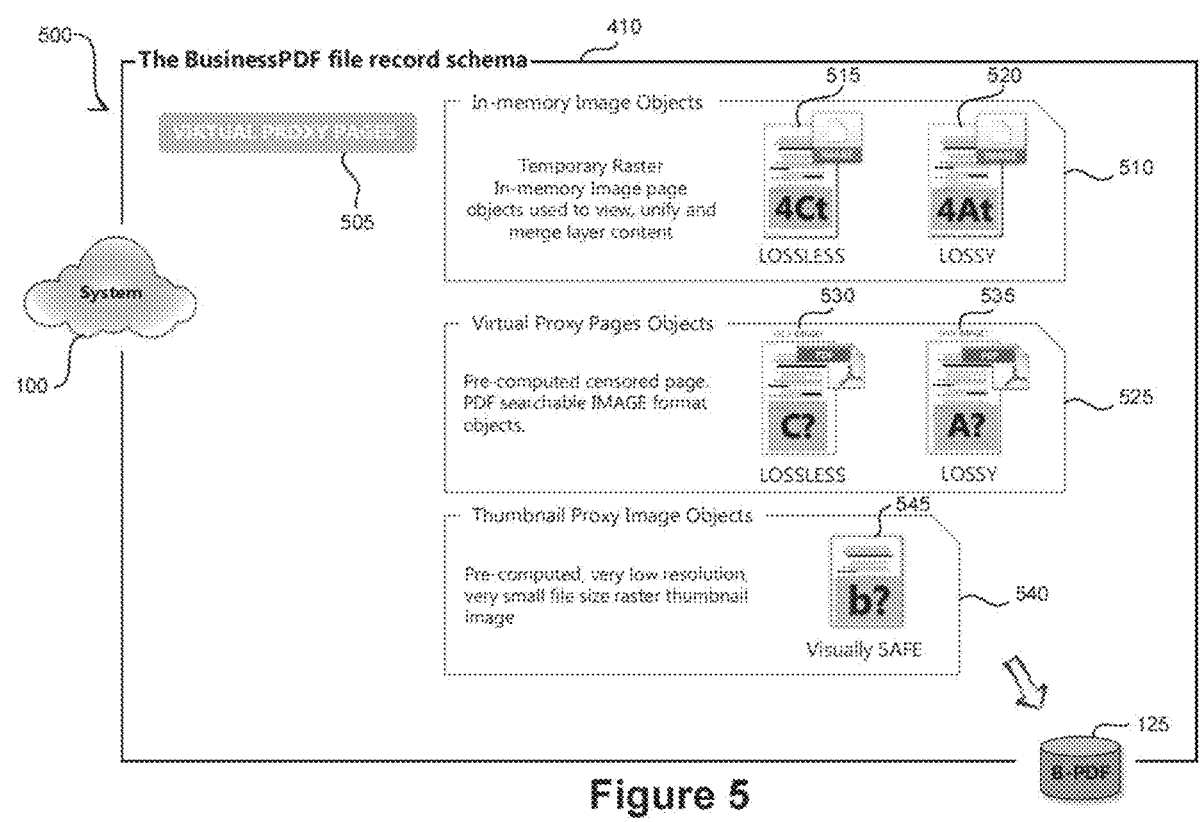
FIG. 5 is a further schematic diagram illustrating the PDF file record schema creating virtual proxy pages.

FIG. 5 is a schematic diagram 500 of the PDF file record schema 410 creating virtual proxy pages 505. Virtual proxy pages 505 include in-memory image objects 510 which are either in lossless format 515 or a lossy format 520. In-memory image objects 510 are preferably a temporary raster in-memory image page object which is used to view, unify and merge layer content. Also provided is a virtual proxy page object 525 which can either be in lossless format 530 or lossy format 535. The virtual proxy pages object 525 are pre-computed censored pages and are PDF searchable image formats (image and text). Also provided are thumbnail proxy image objects 540 which are denoted by thumbnail 545 which is a pre-computed, very low resolution, very small file size raster thumbnail image.

Each of the virtual proxy pages objects 530, 535 and the thumbnail proxy image objects 545 may be multiple versions depending on authorization levels. Each of which may be a virtual proxy page and may be assigned a nominated authorization level. The virtual proxy pages 505 and each of the in-memory image objects 510, virtual proxy page objects 525 and thumbnail proxy image objects 540 are stored in database 125 via server 120.

Figure 6:
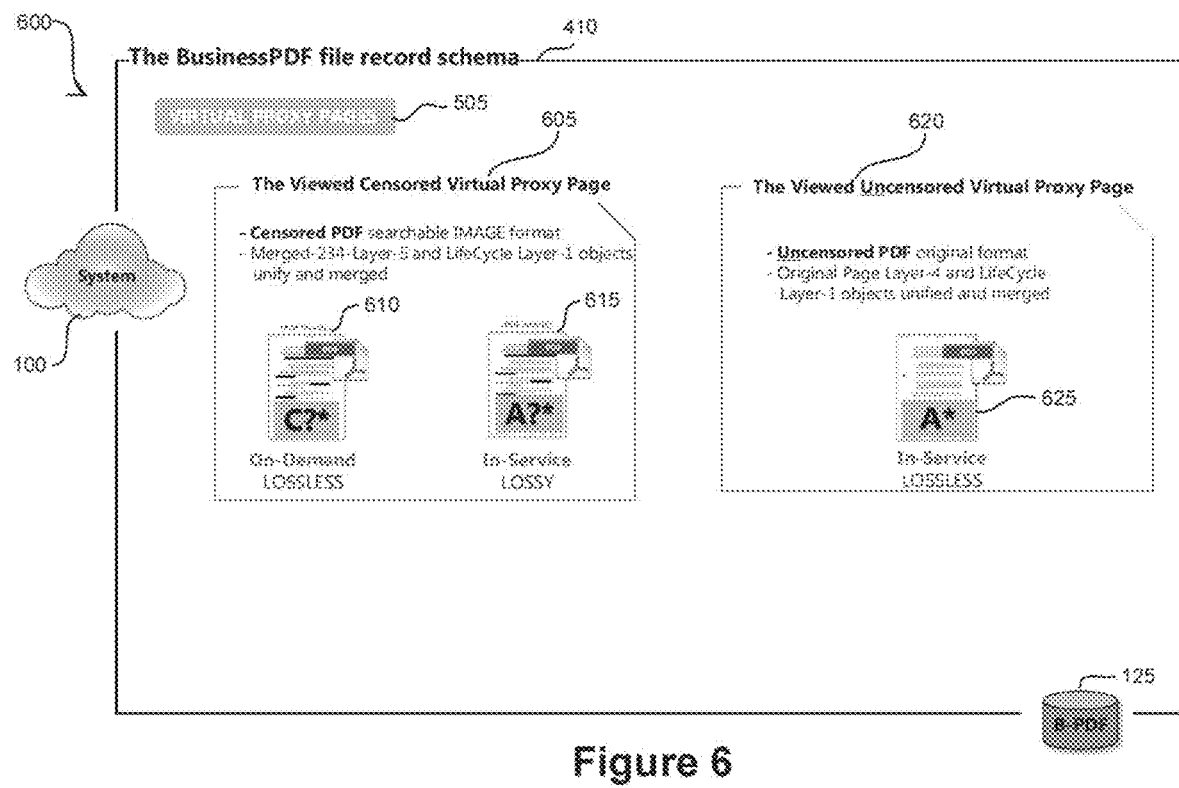
FIG. 6 is a further schematic diagram illustrating the PDF file record schema and operation of virtual proxy pages.

FIG. 6 is a further schematic diagram 600 of a PDF file record schema 410 and operation of virtual proxy pages 505. The virtual proxy pages 505 further includes a viewed censored virtual proxy page 605 and a viewed uncensored virtual proxy page 620. The viewed censored virtual proxy page 605 includes an on-demand (lossless) PDF image 610 as well as an in-service (lossy) PDF image 615. The on-demand lossless and in-service lossy PDF 610, 615 are censored PDFs which are a searchable image format. Each of which may be a virtual proxy page and may be assigned a nominated authorization level. The viewed uncensored virtual proxy page 620 includes an in-service lossless PDF page 625 which is an uncensored PDF original format. The viewed censored virtual proxy page 605 and the viewed uncensored virtual proxy page 620 may include additional layers such as a lifecycle layer. The lifecycle layer overlays information on a page real-time, and provides indicia for the different statuses that the page may go through during its life, giving the reader context to the service of each page. For example this can be used to show if the page is CURRENT, RETIRED, CANCELLED, SUPERSEDED, OFF-LINE at the time when the page is viewed or printed. Operation of the lifecycle layer will be described further with reference to FIGS. 26 to 34. Each of the viewed censored virtual proxy page 605 and the viewed uncensored virtual proxy page 620 are stored in the database 125 via server 120.

Figure 7:
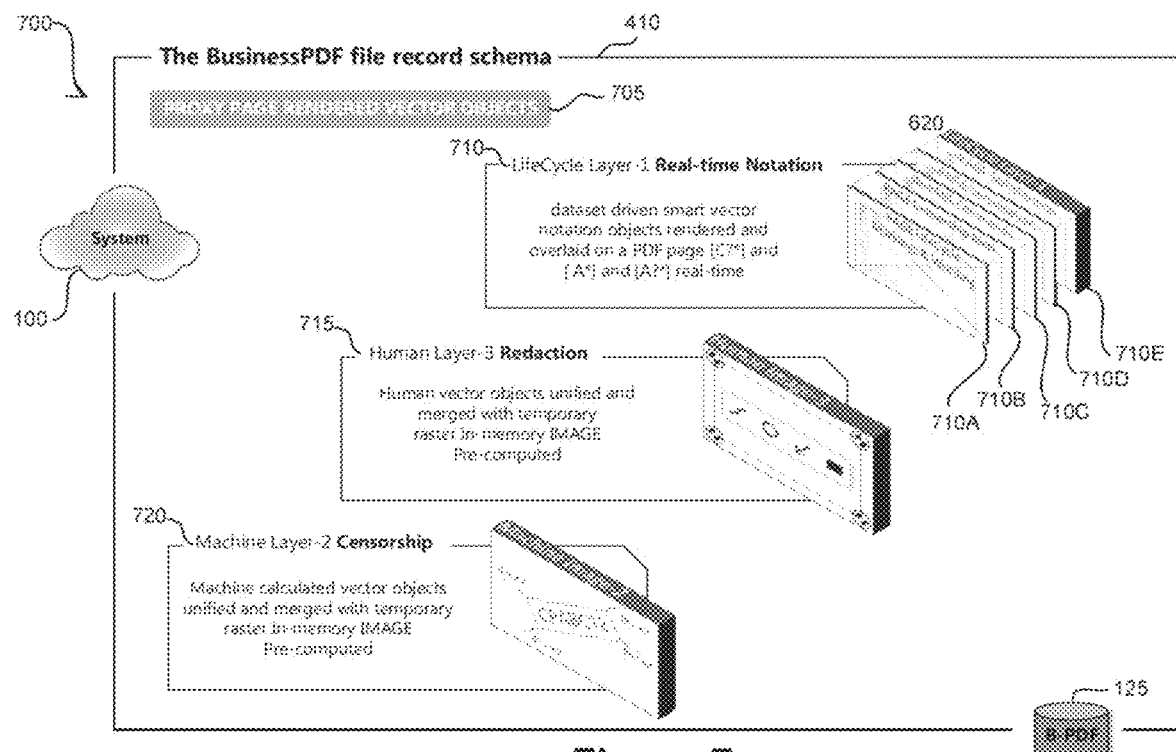
FIG. 7 is a schematic diagram illustrating the PDF file record schema and proxy page render vector objects.

FIG. 7 is a schematic diagram 700 of the PDF file record schema 410 and further includes proxy page render vector objects 705. The proxy page rendered vector objects 705 include a lifecycle layer (which will be described further with reference to FIG. 15), real-time notation which effectively is page specific "artwork" for a given authorization level. The lifecycle layer real-time notation 710 includes dataset driven smart vector notation objects rendered and overlaid on a PDF page (which can be on-demand lossless pages 610 and in-service lossless pages 625 and in-service lossy pages 615 in real time). The lifecycle layer real-time notation 710 includes a number of layers namely page lifecycle markings and wordings 710A, page censorship alerts 710B, in page commands 710C, page serialization 710D and page substitution 710E.

Page lifecycle markings and wordings 710A, is used to provide indicia for the different statuses that a page may go through during its life, giving the reader context to the service of each page. For example this is used to show if the page is CURRENT, RETIRED, CANCELLED, SUPERSEDED, OFF-LINE at the time when the page is viewed or printed.

Page censorship alerts 710B, are used to alert the reader that the PAGE viewed or printed is human or machine censored. This will not be obvious at a higher authorization level, as all redaction mark-ups may be intentionally omitted from a page, removing any visual clue as to the privilege nature of the page. The page censorship alerts therefore signals to the reader that the page is in some way privileged, and that greater care is necessary, as selective parts of the page is censored at a lower authorization level.

In-page commands 710C, when clicked, execute a function against a specific page at a particular authorization level. For example this can be used to initiate a redaction process on the page viewed or change the lifecycle status of the page viewed or access the retained original source file record 440.

Page serialization 710D, is used to selectively personalize each page to an individual user. This serialization is changed each and every time the page is requested by a user of the system 100. For example this can be used so each page can be audited back to whom originally requested that page if found, and which transaction the page belongs to.

Page substitution 710E selectively replaces the entire page from an authorization level. For example where a sensitive keyword maybe found on a page; the function substitutes the entire page from viewing or printing.

The proxy page rendered vector objects 705 includes human layer redaction 715 in which human vector objects are unified and merged with a temporary raster in-memory image which is pre-computed. Human layer redaction will be described further which reference to FIG. 24 and includes each specific censorship for a given authorization level as determined by a user of the system 100.

The proxy page rendered vector objects 705 includes machine layer censorship 720 in which machine calculated vector objects are unified and merged with a temporary raster in-memory image which are pre-computed. Typically this is page specific censorship for a given authorization level which is automatically done by the system 100 and will further be described with reference to FIG. 22. Each of the proxy page rendered vector objects 705 are stored in database 125 via server 120.

Figure 8:
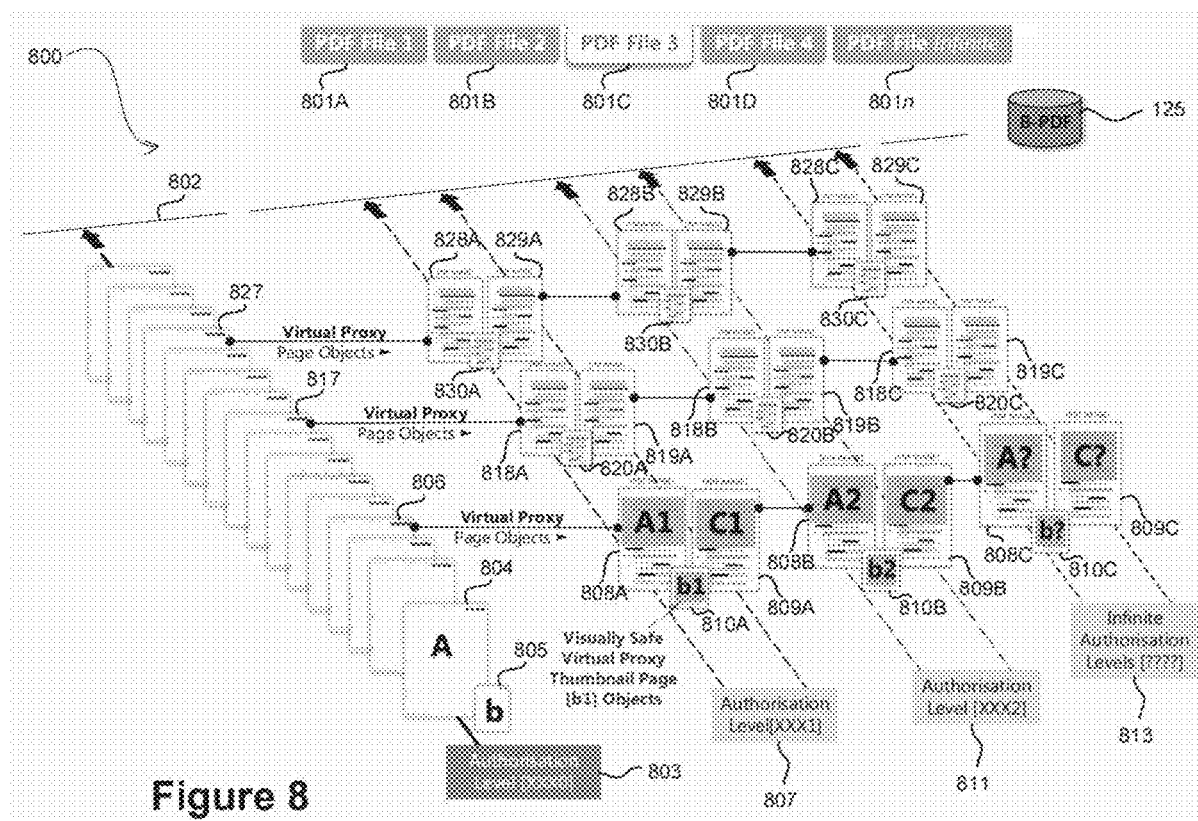
FIG. 8 is a schematic diagram illustrating the PDF file record schema including one or more PDF files.

FIG. 8 is a schematic diagram 800 of the PDF file record schema 410 which includes one or more PDF file record schema files 801A, 801B, 801C, 801D, . . . 801n.

For PDF file 801C, the PDF is split into pages which are full resolution PDF page objects 802. The full resolution PDF page objects 802 are associated with an authorization level 803, which is typically highest authorization level since this is likely to be the unamended and uncensored PDF file record schema 410. The full resolution PDF page objects 802 include a number of uncensored pages 804 and corresponding virtual thumbnail objects 805. A number of pages may need to be censored or modified, for example, pages 806, 817 and 827.

Page 806 includes virtual proxy page objects 808A which is a lossy PDF image of the page which is censored according to authorization level 1. The authorization level is shown by 807. Also provided is a lossless censored page 809A, again at authorization level 1. Also computed is virtual proxy thumbnail 810A at authorization level 1. The authorization level 807 may include a certain level of censorship or redaction different to that of authorization level 811 or authorization level 813. For example, the same page 806 may be subject to a second authorization level at 811 which includes a page object 808B which is lossy and a page object 809B which is lossless but each at authorization level 811. Also provided is a thumbnail 810B which again is provided at authorization level 811. As will be appreciated, any number of authorization levels may be provided for each particular page 806 as shown in lossy page 808C, lossless page 809C and thumbnail 810C, all of which are at any number of authorization levels 813. It will also be appreciated that the authorization level may be viewed as "vertical" levels of authorization (in hierarchical sense) for example, documents within a particular organization may include levels like, protected, confidential, secret, top secret, and the like. Authorization levels may also be viewed as "horizontal" levels of authorization (in a ring-fencing sense) and these documents may also be viewed with a "horizontal" levels of authorization (in a ring-fencing sense) for example limitation including geographic region, legal jurisdiction, but need not be, it could be any type of boundary classification.

It will be appreciated that this does not apply to one page only and, for example, page 817 of the uncensored PDF 802 may be censored at authorization level 807 via pages 818A, 819A and thumbnail 820A, at authorization level 811 via pages 818B, 819B and thumbnail 820B and via authorization 813 via pages 818C, 819C and thumbnail 820C.

Again page 827 may be restricted at authorization level 807 via pages 828A, 829A and thumbnail 830A, at authorization level 811 via pages 828B, 829B and thumbnail 830B and at authorization level 813 via pages 828C, 829C and thumbnail 830C.

As will be appreciated, any number of PDF file record schema denoted by 801A to 801n may be amended and each particular page of that record may be amended and each page may have any number of authorization levels. It will be appreciated that the pages described in FIG. 8, namely PDF pages 808A, 808B, 808C, 818A, 818B, 818C, 828A, 828B and 828C, are all lossy virtual pages of the original page objects in file 802 which are suitably censored or redacted as per the authorization level. The purpose of the lossy virtual proxy page is to provide the user 105, 110 a relatively fast version of the page. In the event the user 105, 110 requires a lossless version of that page the User may click on the HIGH (or LOW) 'page notations and marks' to switch page resolution which will then prompt the system 100 to provide a lossless page which may be easier to read or to print if and when required.

Figure 9:
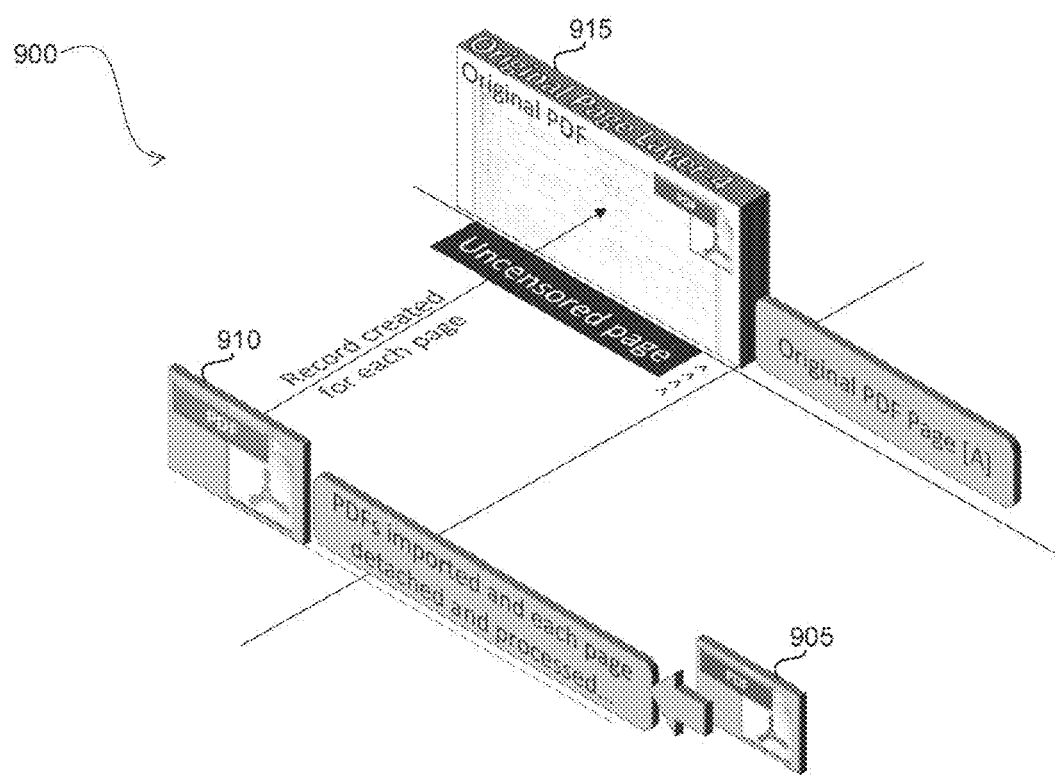
FIG. 9 is a schematic diagram of the page level record architecture.

FIG. 9 is a schematic diagram 900 of the PDF page level record architecture. PDF file 905 is imported and each page is detached and processed as described with reference to FIG. 4. The processed PDF 910 has a record created for each page. The record 915 is the original page layer of an uncensored page and in this case is an uncensored page 420.

Figure 10:
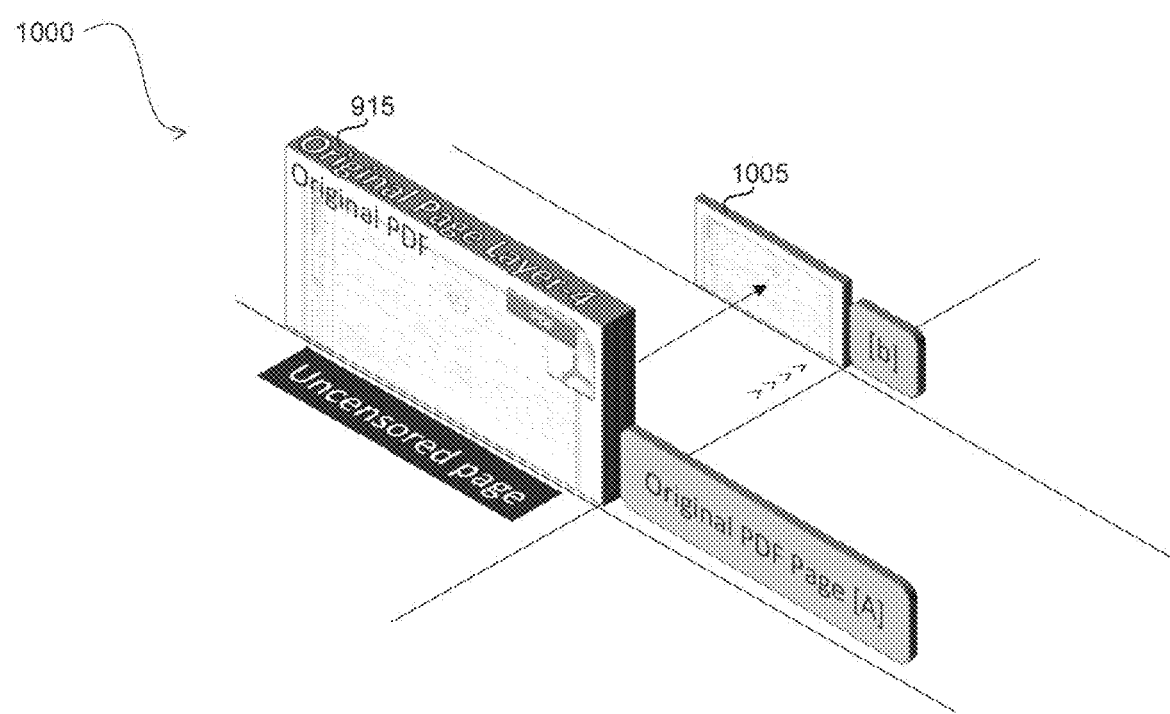
FIG. 10 is a schematic diagram of the generation of pre-computed low resolution raster thumbnail images based on each page of the original page layer.

FIG. 10 is a schematic diagram 1000 of the generation of pre-computed low resolution raster thumbnail images 1005 based on each page of original page layer 915. The thumbnail in this case is an uncensored page thumbnail 425.

Figure 11:
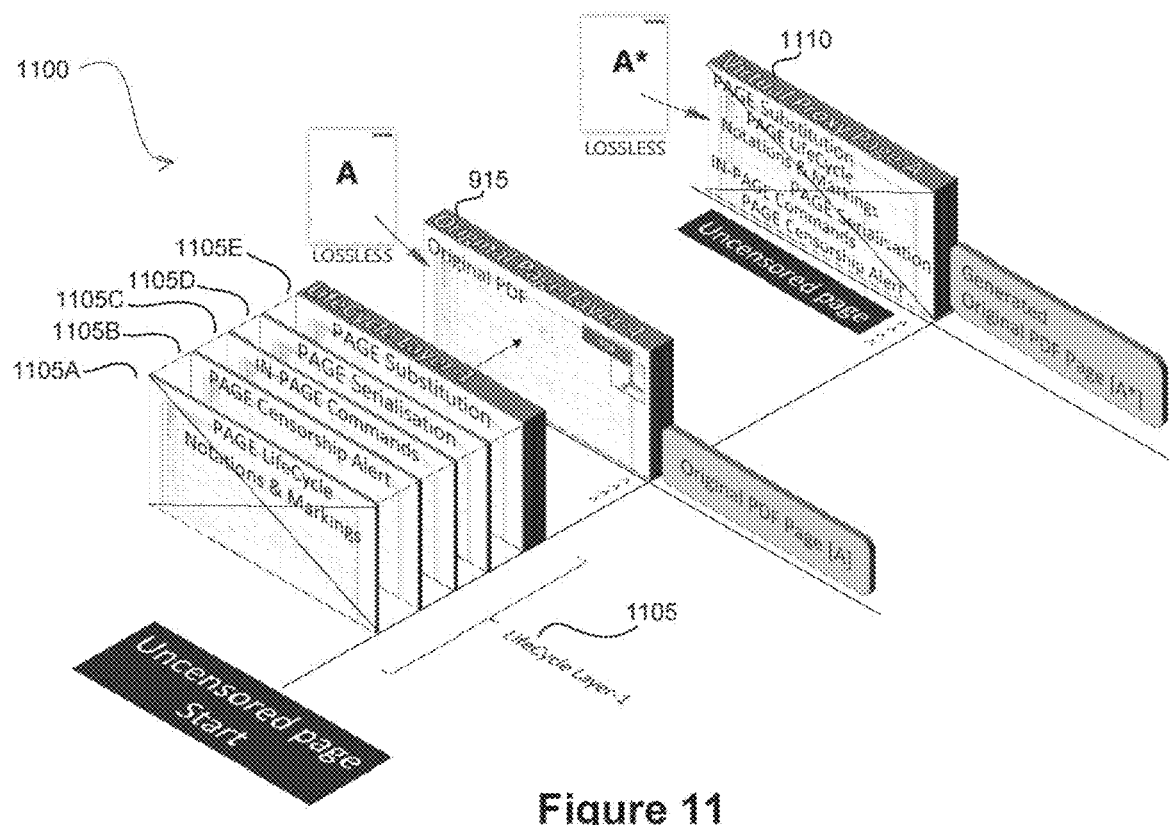
FIG. 11 is a schematic diagram of the uncensored PDF page level record architecture.

FIG. 11 illustrates a schematic diagram 1100 of the uncensored PDF page level record architecture and, in particular, the real-time generation of a lossless virtual proxy page 1110 by merging both the lifecycle layer 1105 and the original page layer 915. The lifecycle layer 1105 includes a number of sub-layers namely a page lifecycle notation markings layer 1105A, a page censorship alert layer 1105B, an in-page command layer 1105C, a page serialization layer 1105D and page substitution layer 1105E as described with reference to FIG. 7.

Figure 12:
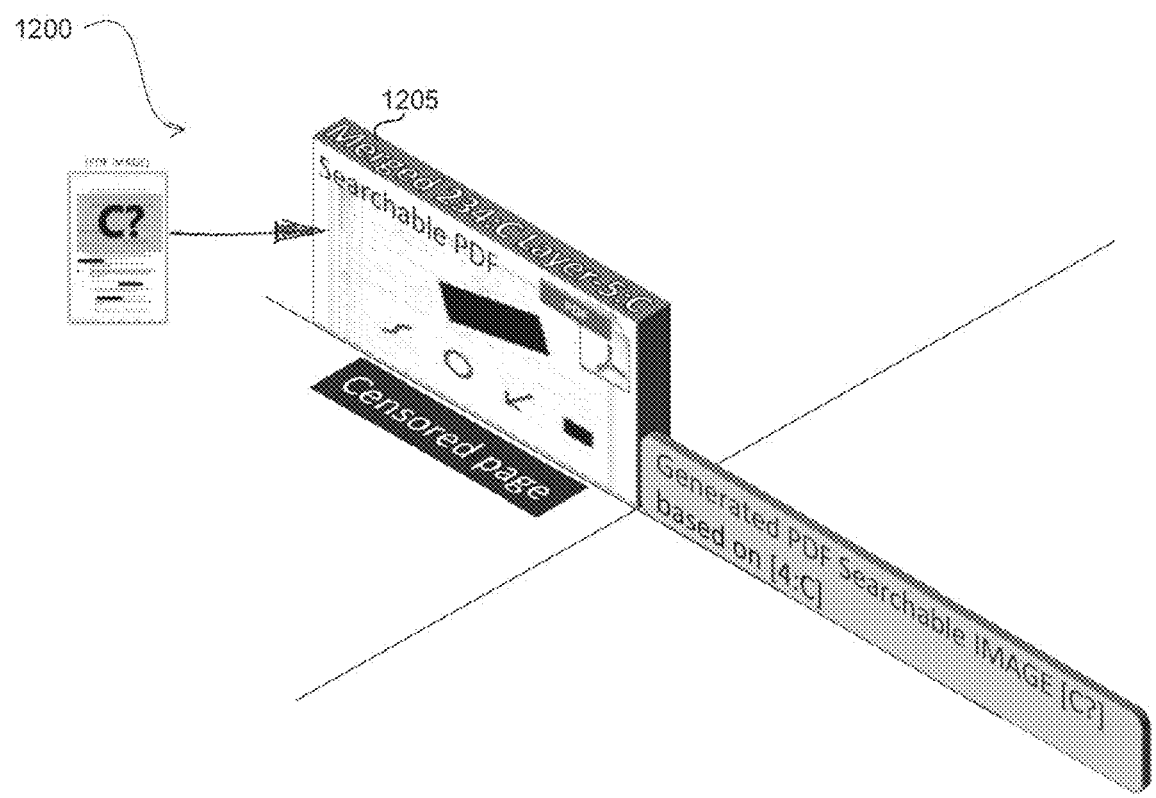
FIG. 12 is a schematic diagram of the censored PDF page level record architecture.

FIG. 12 is a schematic diagram 1200 of the censored PDF page level record architecture including a merged censored lossless high resolution page 1205 which is a combination of machine layer redaction, human layer redaction, the original in-memory image page which is combined to provide a virtual PDF image which is censored thus providing a censored virtual proxy page 530. The proxy page record object 1205 is also PDF searchable (image and text).

Figure 13:
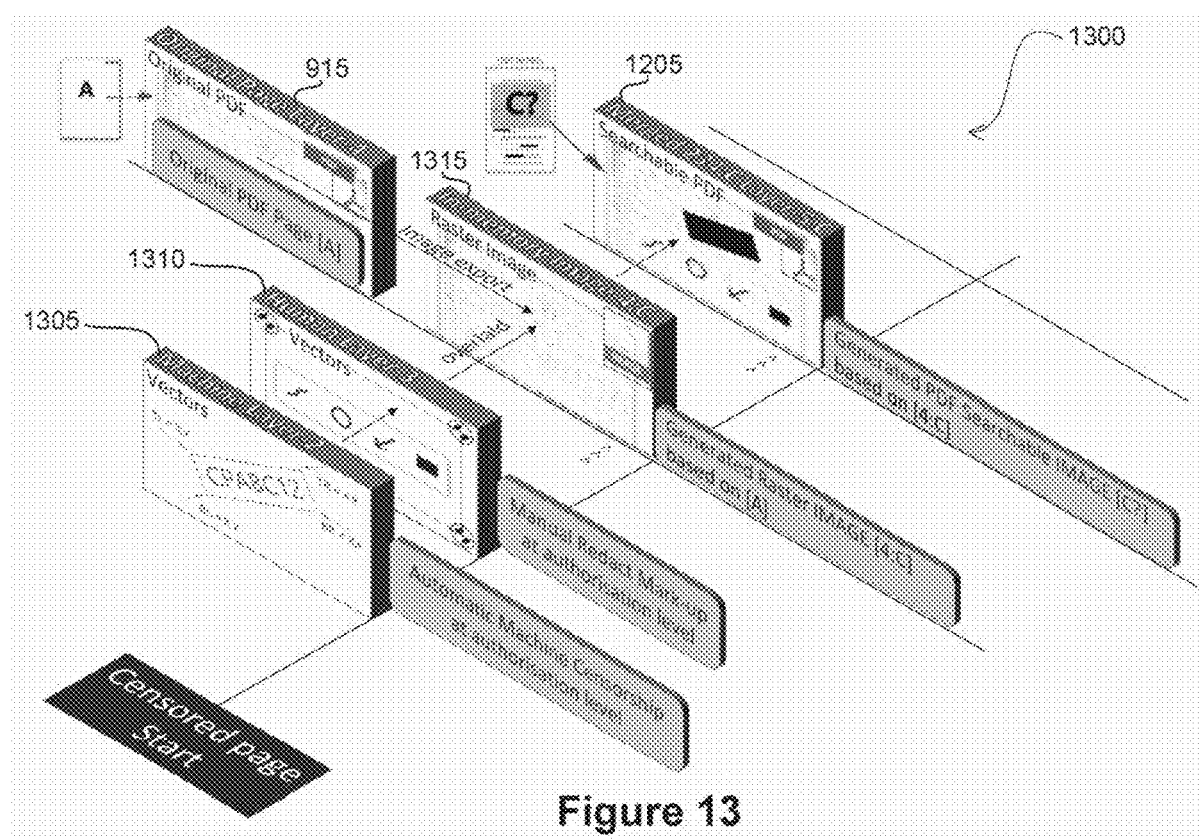
FIG. 13 is a further schematic diagram of the censored PDF page level record architecture.

FIG. 13 is a schematic diagram 1300 of censored PDF page level record architecture including a machine layer 1305 in which automatic machine censorship is carried out at a particular authorization level. This will be further described with reference to FIG. 22. Also included is a human layer redaction layer 1310 which is manually redacted material marked up at a particular authorization level by a user of the system 100. This will be further described with reference to FIG. 24. Also provided is original page layer 915 which is imported into in-memory image 1315. The pre-computed merged page 1205 is generated by unifying and merging machine layer 1305, human layer 1310, in-memory image 1315 (which is saved as a PDF page record and OCR is carried out) to provide a merged layer searchable image 1205 which is censored as per the authorization level.

Figure 14:
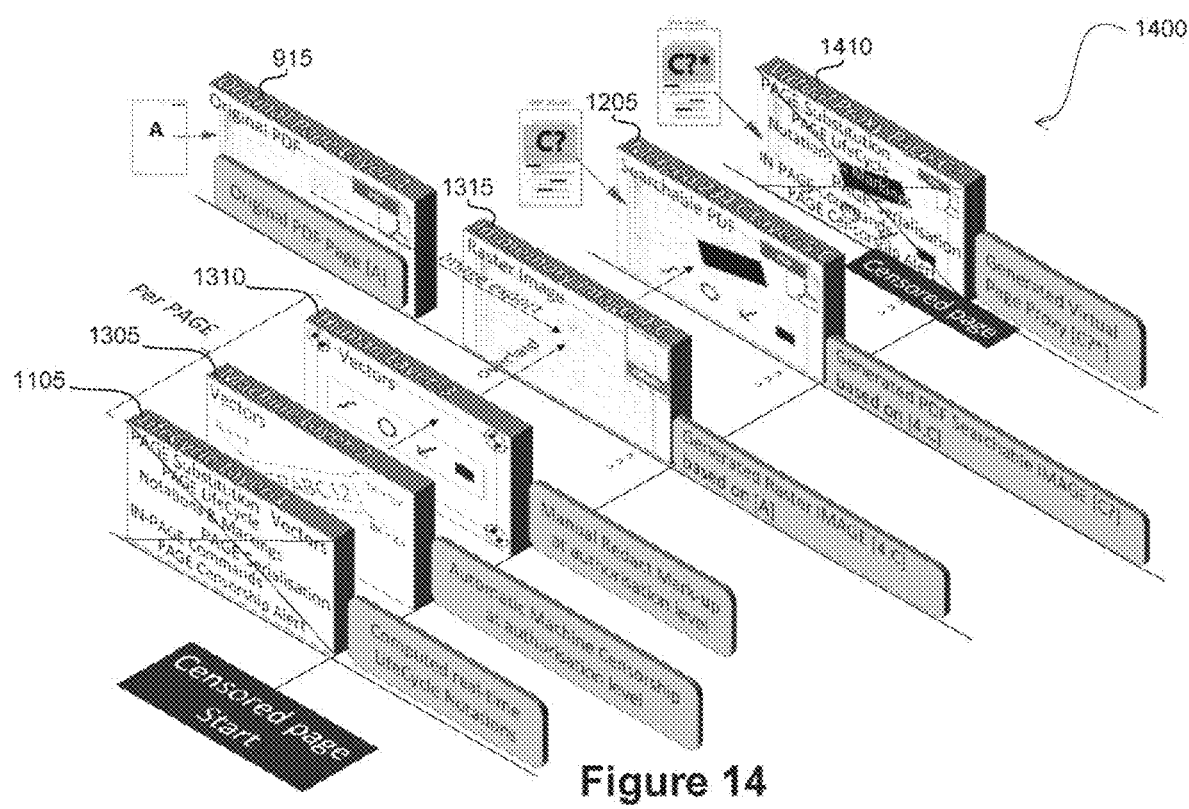
FIG. 14 is another schematic diagram of the censored PDF page level record architecture.

FIG. 14 is a schematic diagram 1400 which is similar to that of FIG. 13 but includes all of the components of the page level architecture on a lossless high resolution page. The pre-computed page 1410 is generated at the authorized level by unifying and merging machine layer 1305, human layer 1310 and in-memory image 1315 to provide a merged PDF searchable image 1205 and from there a virtual proxy page 1410 is provided in this case a lossless high resolution page 610.

Figure 15:
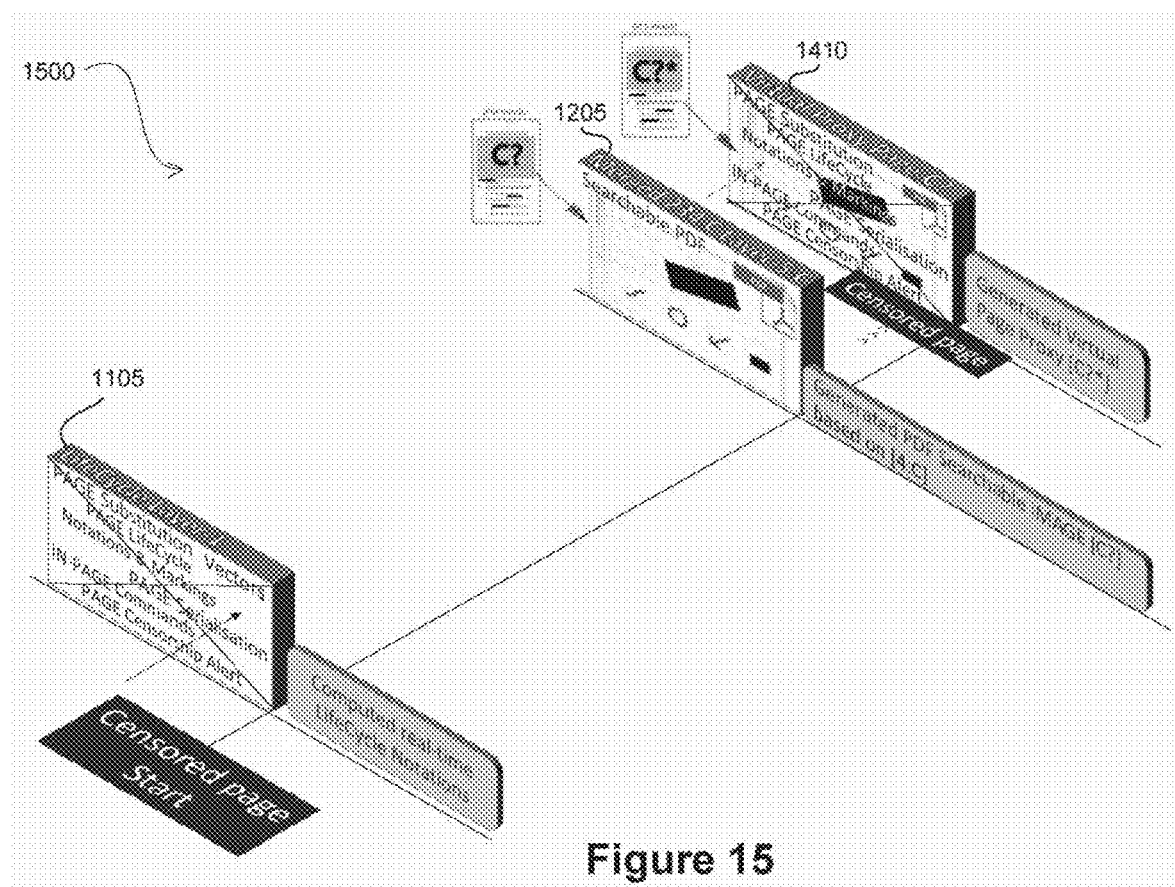
FIG. 15 is a schematic diagram of a censored PDF page level record architecture including lifecycle layer.

FIG. 15 is a schematic diagram 1500 of a censored PDF page level record architecture including lifecycle layer 1105 with computed real-time lifecycle notations combining this with a PDF searchable image 1205 to provide virtual proxy page 1410 which is a high resolution censored PDF page 610 that the user will see depending on their authorization level.

Figure 16:
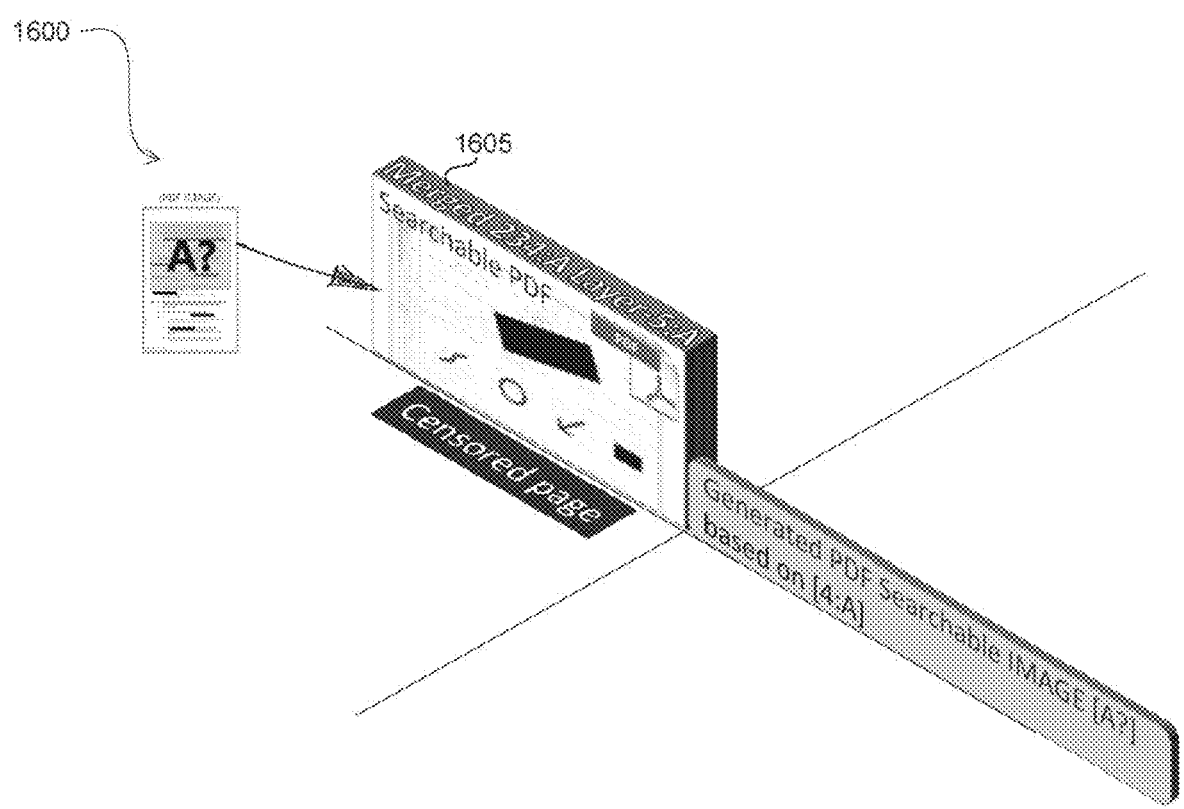
FIG. 16 is a schematic diagram of a censored PDF page level record architecture including a pre-computed in-service PDF searchable (image and text) proxy page record object.

FIG. 16 is a schematic diagram 1600 of the censored PDF page level record architecture including a merged censored on-demand low resolution page 1605 which is a scaled combination of machine layer redaction, human layer redaction, the original in-memory image page which is combined as the censored page to provide a virtual PDF image which is censored thus providing a censored virtual proxy page. The proxy page record object 1605 is also PDF searchable (image and text) in this case a lossy low resolution page 535.

Figure 17:
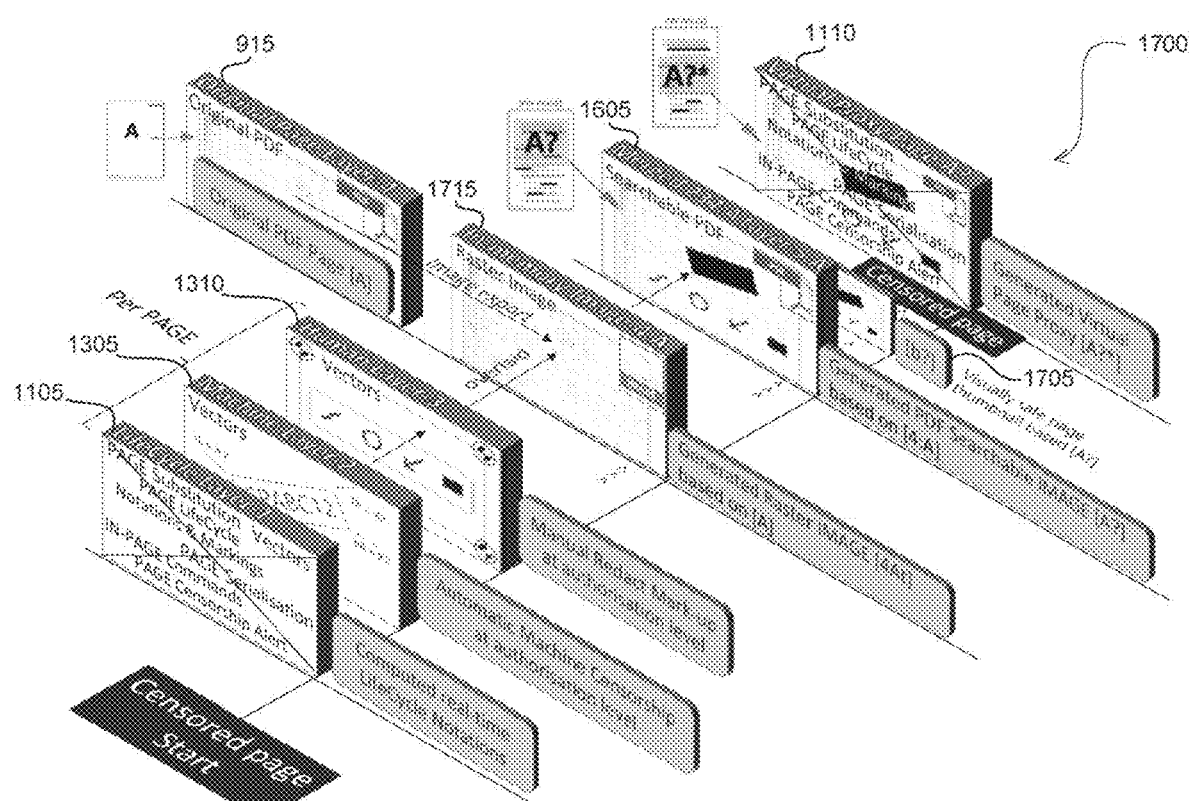
FIG. 17 is a schematic diagram of a censored PDF page level record architecture showing the generation of a pre-computed page at a particular authorized level.

FIG. 17 is a schematic diagram 1700 which is similar to that of FIG. 14 but includes all of the components of the page level architecture on a low resolution page. The pre-computed page 1110 is generated at the authorized level by scaling, unifying and merging machine layer 1305, human layer 1310 and in-memory image 1715 to provide a merged PDF searchable image 1605 and from there a virtual proxy page 1110 is provided in this case a low resolution page 615.

Figure 18:
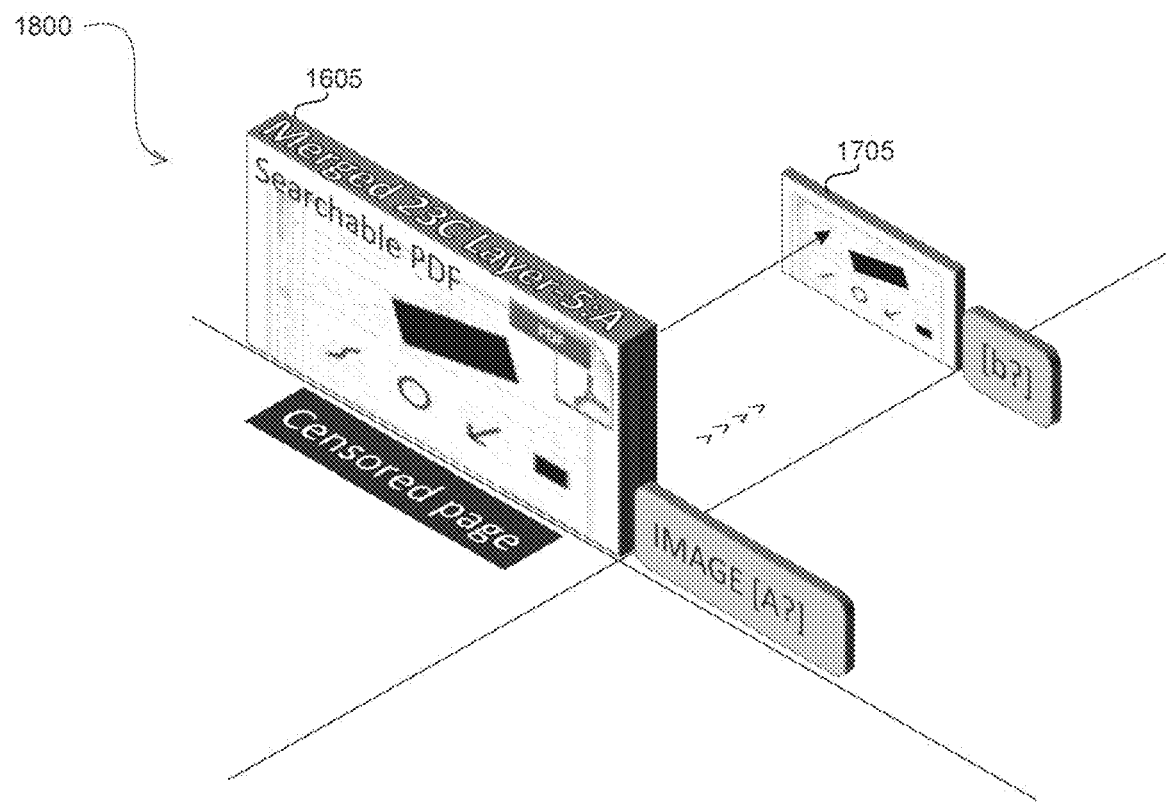
FIG. 18 is a schematic diagram illustrating generation of a low resolution, small file raster thumbnail image.

FIG. 18 is a schematic diagram 1800 which illustrates the generation of a low resolution, small file raster thumbnail image 1705 based on the generated PDF searchable image 1605. The thumbnail in this case is a censored and visually safe page thumbnail 540 at the particular authorization level.

Figure 19A:
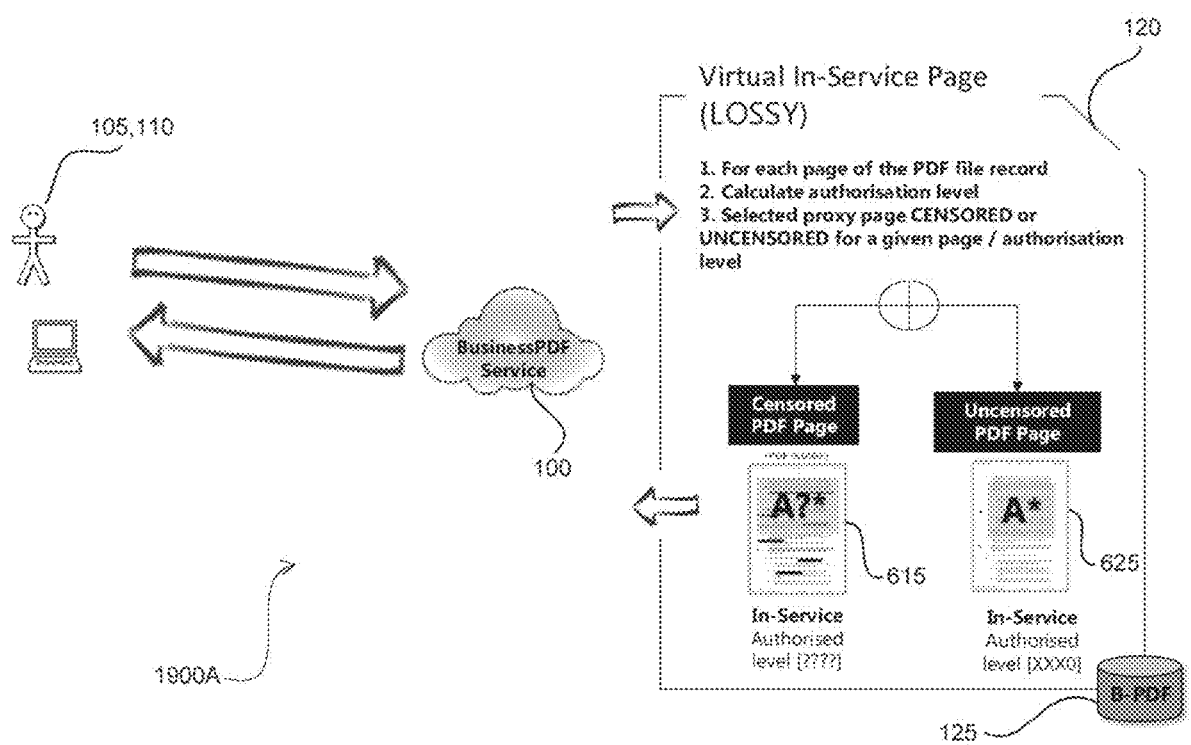
FIG. 19A is a schematic diagram illustrating the end user accessing a PDF which may have censored or uncensored pages.

FIG. 19A is a schematic diagram 1900A of providing "in-service" pages to a user via computer 105, 110 in which a URL call is used to open an in-service PDF file at a particular authorization level. The system 100 creates a virtual in-service PDF file via the server 120 and database 125 for each page in the PDF file record schema 410, calculates an authorization level and selects a proxy page which is either censored 615 or uncensored 625 for a particular page given the authorization level associated with the user of computer 105, 110. For each page either a censored PDF page object is provided at a lower resolution 615 or an uncensored original PDF page object 625 is provided to the user for display on the computer 105, 110. Should the user wish to view a lossless version of that censored page, then the User may click on the HIGH (or LOW) 'page notations and marks' on the page and a lossless page 610 (shown in FIG. 19B) is served to them.

Figure 19B:
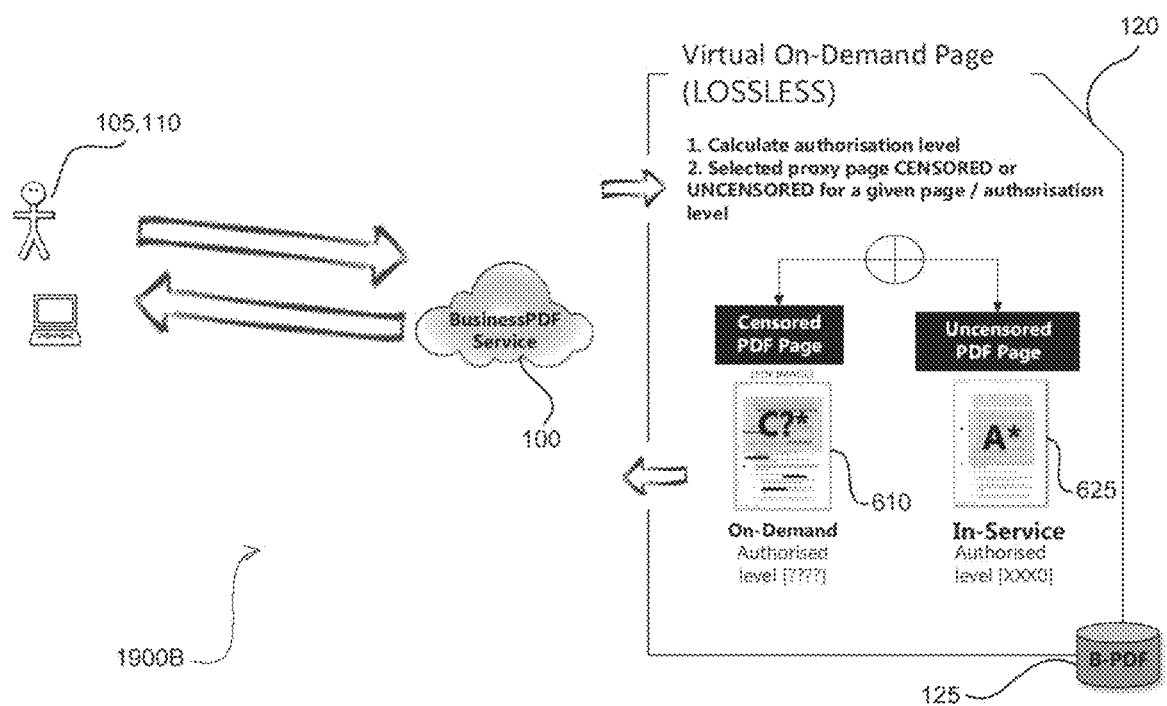
FIG. 19B is a schematic diagram illustrating the end user accessing a LOSSLESS PDF page to a user.

FIG. 19B is a schematic diagram 1900B illustrating the end user associated with computer 105, 110 accessing a PDF which may have been censored by another user via computer 115 using the system 100 of the present invention. In particular, the user via computer 105, 110 initiates a URL call to open an on-demand page 610 via the system 100. The system 100 contacts server 120 and requests a virtual on-demand page (in this case a lossless page 610) because the user has required a high resolution PDF page at a particular authorization level. The user may have viewed a censored lossy version of the page 615 (such as that shown in FIG. 19A) but has requested to see a censored lossless version 610. The system then selects the page objects to present to the user based on whether any pages are required to be censored 610 or uncensored 625 for a particular page or depending on the authorization level. The virtual on-demand PDF page is displayed to the user associated with computer 105, 110 and the extent to which it is censored depends on the user's authorization level. The PDF is provided and served to the user at the computer 105, 110 in real-time and with the appropriate authorization level.

Figure 20:
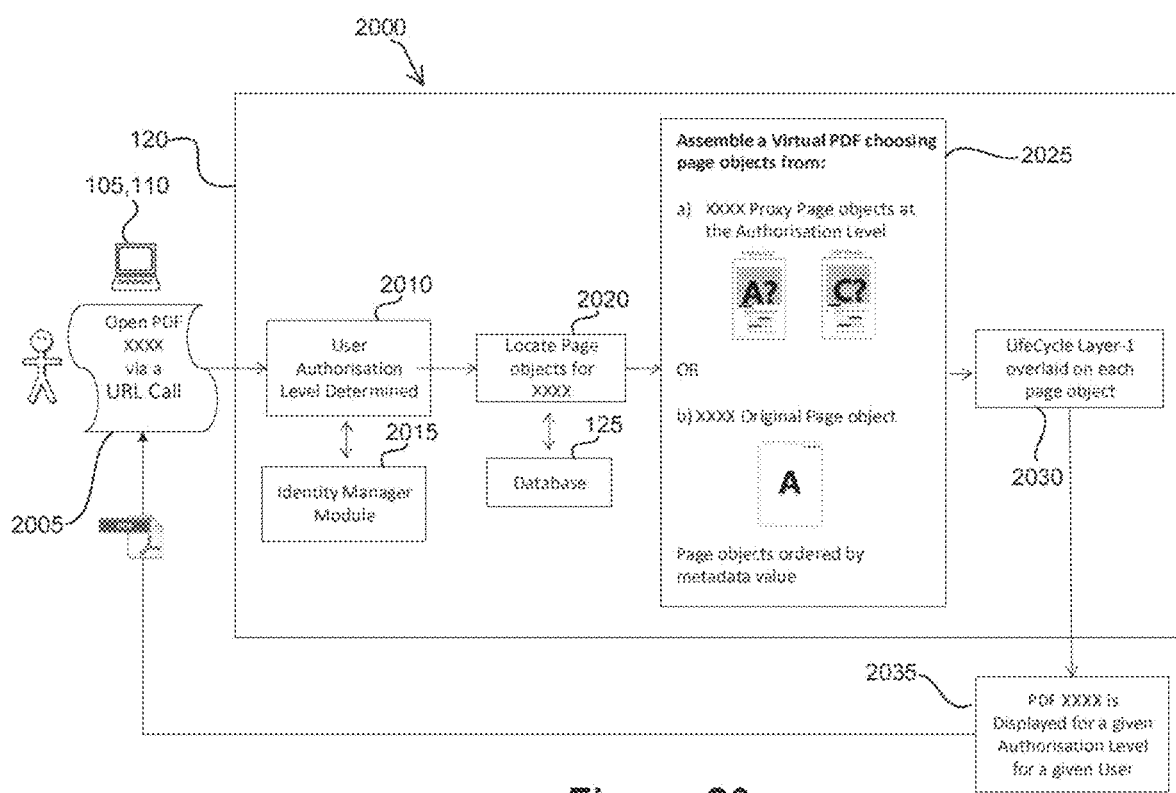
FIG. 20 is a schematic diagram of the user accessing a page via a URL.

FIG. 20 is a schematic diagram 2000 illustrating the operation of the URL call. The end user associated with computer 105, 110 accesses a PDF which may have been selectively censored by another user via computer 115 using the system 100 of the present invention. In particular, the user or 3$^{rd}$ party software programs via computer 105, 110 initiates a URL call 2005 to open a PDF via the system 100. The URL includes the ID of the PDF document to be opened. The system 100 contacts server 120 and requests the virtual PDF document (either lossless or lossy page depending on the user request) at a particular authorization level. At 2010 the system 100 determines the user authorization level via an identity manager module 2015—this typically will occur via the user logging into the system 100. Once the user authorization level is determined, page objects are located at 2020 via database 125. The page objects are then assembled at 2025 where page objects may be selected from any number of objects at a particular authorization level (there may be multiple versions of the document at a number of authorization levels). Therefore, only those proxy pages at the relevant authorization level are selected. A lifecycle layer 2030 may be placed on each page object (as described with reference to FIG. 6). The virtual PDF is displayed at 2035 to the user associated with computer 105, 110 and the extent to which it is censored depends on the user's authorization level. The virtual PDF is provided and served to the user at the computer 105, 110 in real-time and with the appropriate authorization level.

Advantageously, using this arrangement, many different users can reuse the same URL to open the 'same' PDF file record schema and share this URL within e-mails or 3$^{rd}$ party software programs, but depending on their authorization level established at the login stage, will depend ultimately on which pages are selectively served to the user. If a user role changes (and authorization levels change) information previously available or concealed will be revealed or concealed, depending on the new authorization level.

Figure 21A:
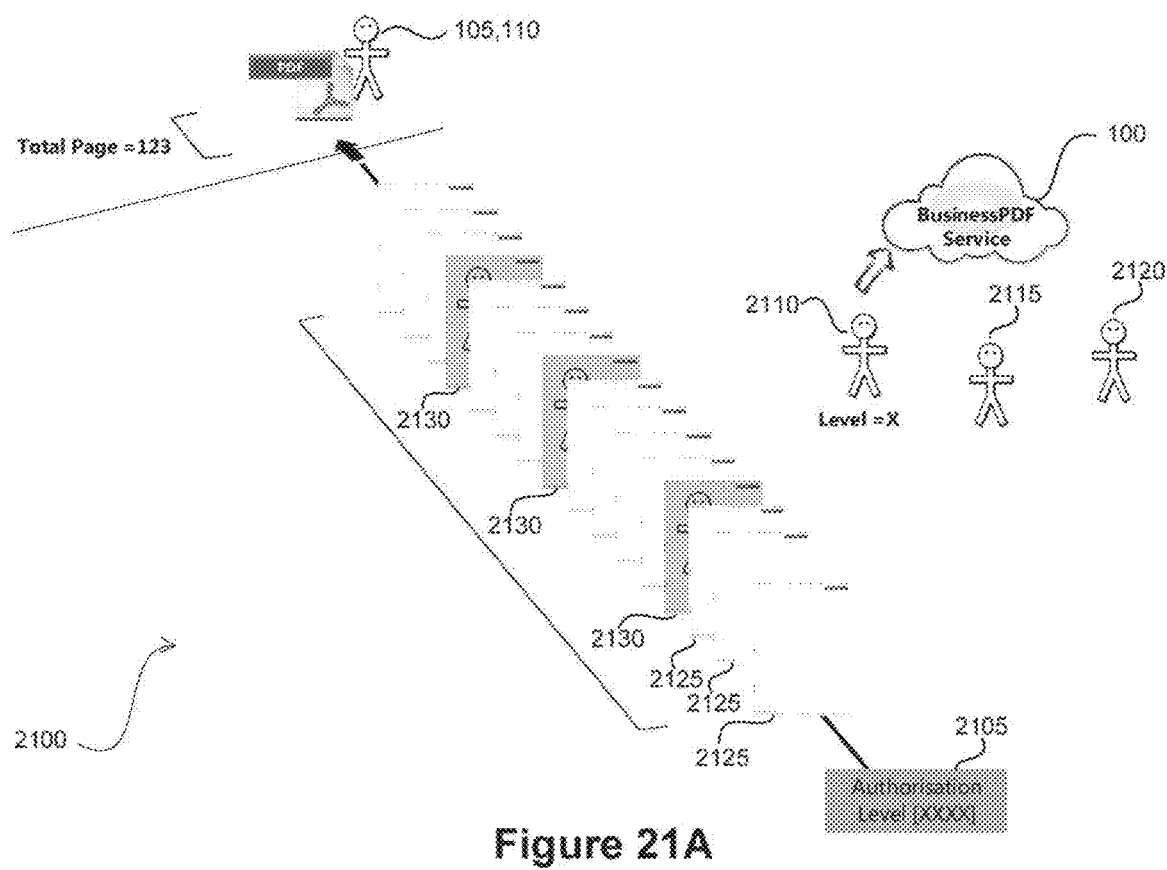
FIGS. 21a to 21c are schematic diagrams illustrating authorization levels within a particular PDF file record schema.

FIG. 21a is a schematic diagram 2100 illustrating authorization levels within a particular PDF record. The PDF 2105 record includes a number of pages at an authorization level which may be censored or uncensored. For example, censored pages are pages 2130 whereas uncensored are pages 2125 for a particular user 2110. On request, the user 2110 associated with computer 105, 110 is provided with the PDF record 2105 but with a number of pages 2130 which are censored based on the authorization level of user 2110.

Figure 21B:
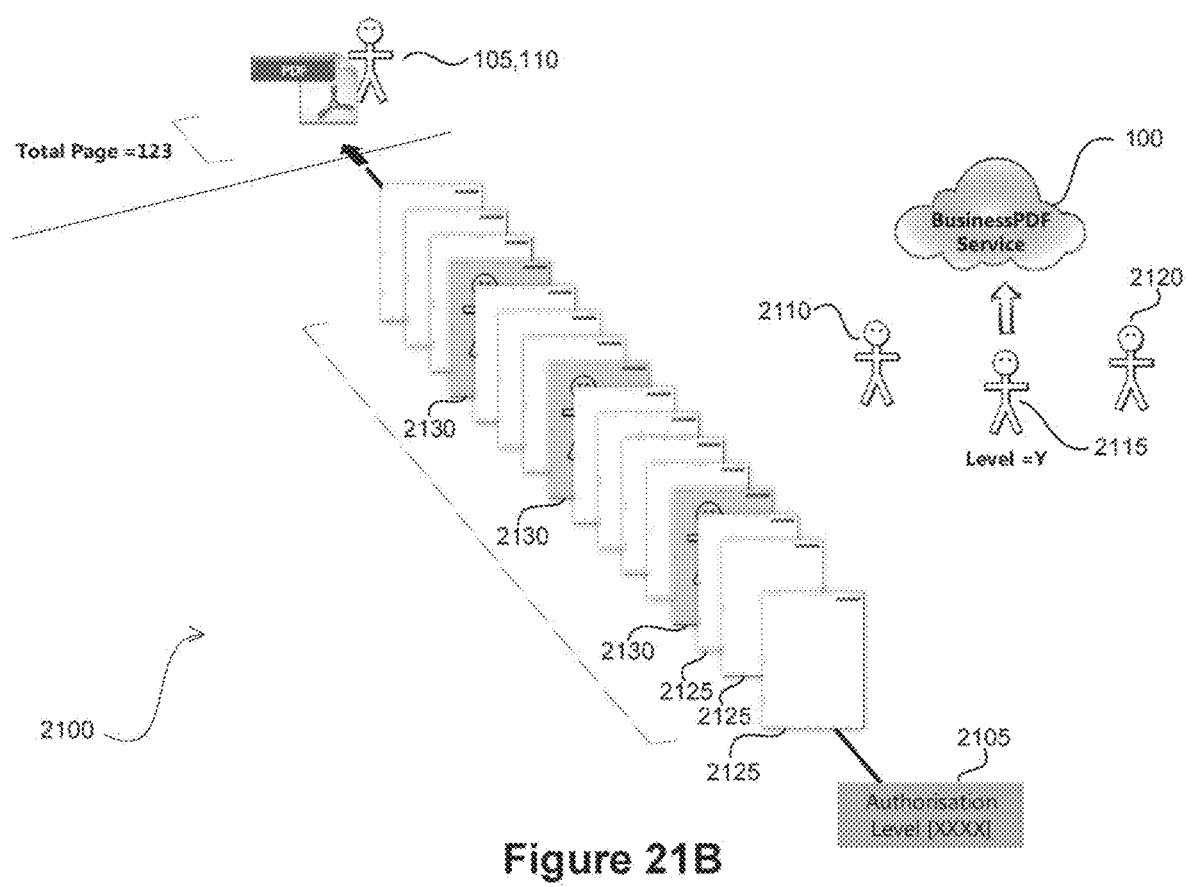

Turning to FIG. 21b, there is a schematic diagram 2100 of a PDF record 2105 containing pages 2125 which are uncensored, pages 2130 which are censored and only for user 2115. The pages served to user 2115 may differ from those available to user 2110 since their authorization levels may be different.

Figure 21C:
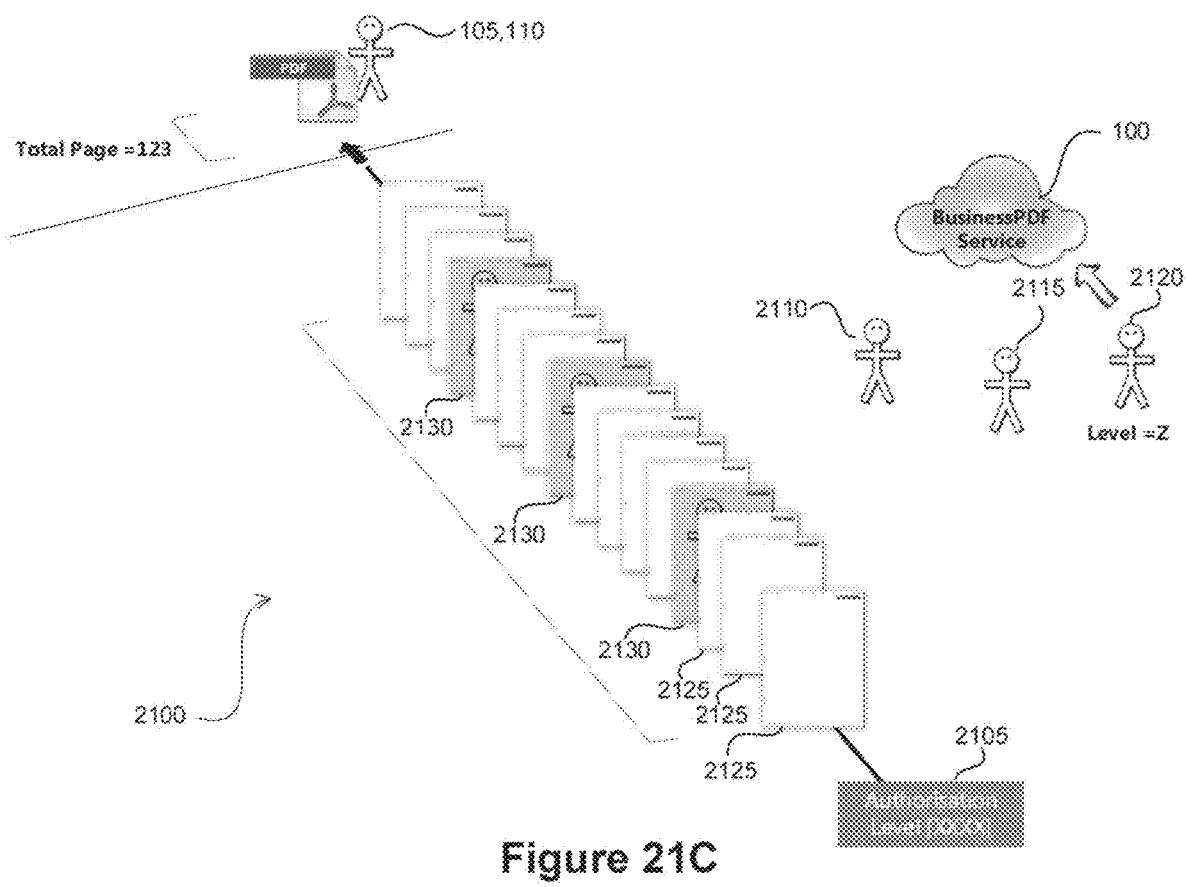

Likewise, FIG. 21c illustrates a schematic diagram 2100 illustrating a PDF record 2105 having uncensored pages 2125 and censored pages 2130. In this case the pages 2130 are not visible to user 2120 and may be different to the pages that are visible to user 2110 as per FIG. 21a and user 2115 as per FIG. 21b. It will be appreciated that the number of authorization levels is infinite and, for example, be an infinite number of equivalent pages which are visible to different people depending on their authorization level.

Figure 22A:
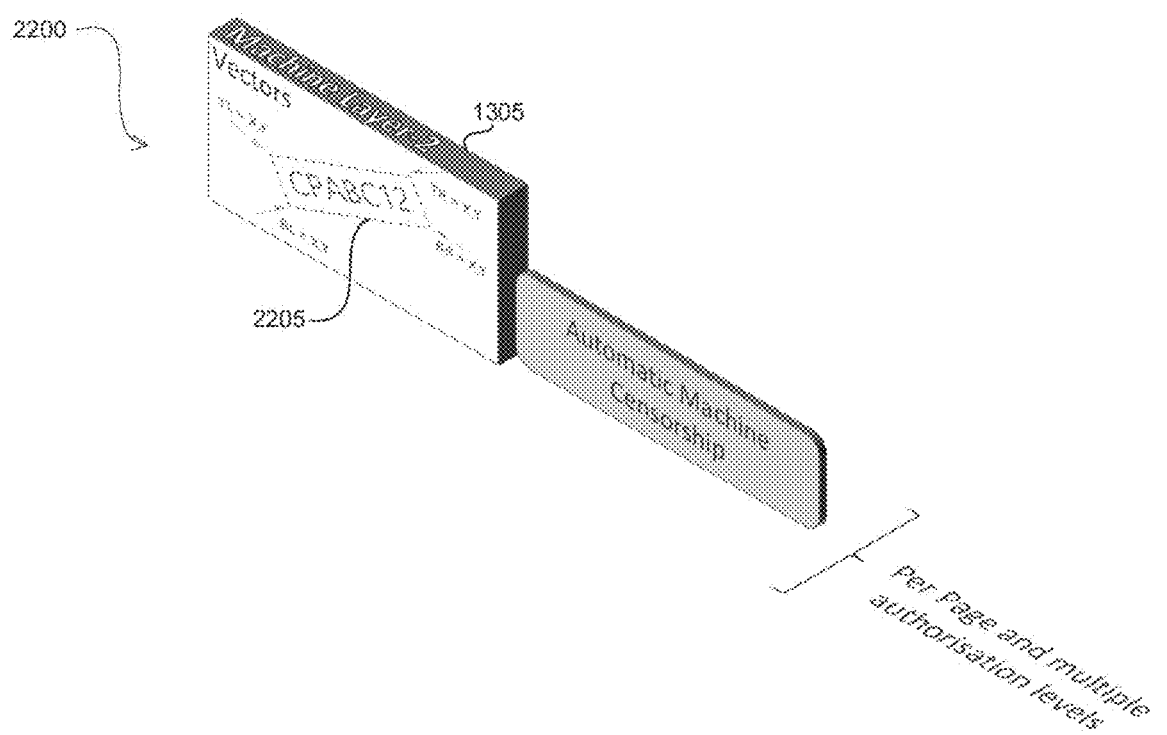
FIG. 22A is a schematic diagram illustrating machine censorship per page at a particular authorization level.

FIG. 22A is a schematic diagram 2200 illustrating machine censorship per page at a particular authorization level. The machine layer 1305 may be amended automatically by one or more vectors and block out polygons 2205 on each page and for any number of authorization levels. For example, an input character pattern (e.g., xxxxx) may be globally censored on all pages at an authorization level where xxxxx equals the character pattern found in a searchable PDF formatted file 420. Newly added PDFs may be censored via a background process when the file is imported into the system 100 of the present invention or when the character pattern is updated. For example, particular keywords or character patterns may be concealed automatically where a matching character pattern is found, the whole page may be concealed if the matching character is found or the PDF file may be withdrawn from service if the matching character is found. All of this may occur at a particular authorization level. A broadcast may be provided when a particular page featuring those keywords is accessed, for example, an email may be sent, no action may be taken or a SMS may be sent. If a particular character, pattern or keyword is found, two step identity verification or the like may be required.

Figure 22B:
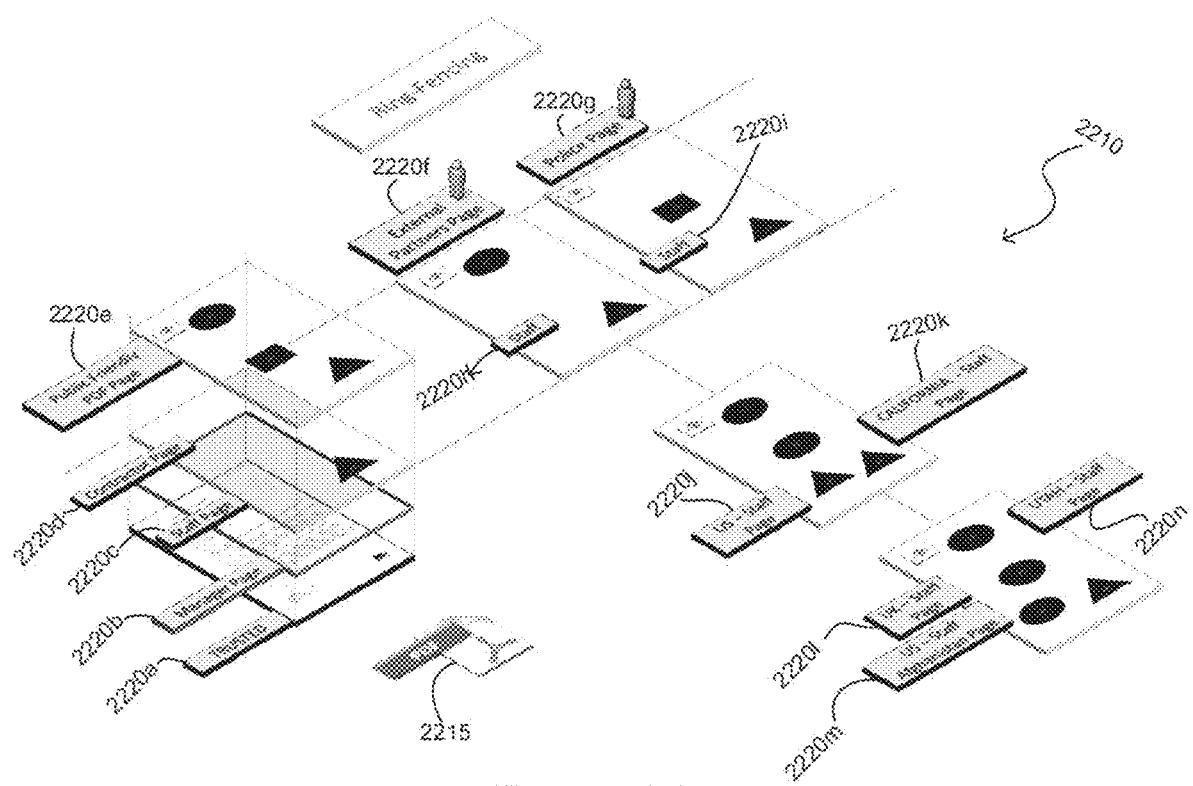
FIG. 22B is a schematic diagram illustrating different types of authorization and ring-fencing levels.

FIG. 22B is a schematic diagram 2210 illustrating different types of authorization levels within a PDF record 2215. PDF record 2215 may include one or more types of authorization levels which may be considered to be "vertical" levels of authorization (in a hierarchical sense) for example, documents within a particular organization may include a number of vertical levels such as trusted 2220a, a manager proxy page 2220b, a staff proxy page 2220c, a contractor proxy page 2220d and a public friendly proxy page 2220e, all of which may have different levels of redaction within the document.

PDF record 2215 may also include one or more types of cross-authorization levels which may be considered to be "horizontal" levels of authorization (in a ring-fence sense) for example, documents within a particular organization may include a number of "horizontal" levels such as ring-fencing external Partners proxy page 2220f, Police proxy page 2220g, US Staff proxy Page 2220j, California Staff proxy Page 2220k, UK Staff proxy Page2220i, UTAH Staff proxy Page 222n, US Staff Afghanistan proxy Page 2220m all of which may have different levels of redaction within the document.

For example, an external partner's proxy page 2220f may be provided which effectively is the same document as that of staff proxy page 2220c or contractor proxy page 2220d but has been marked as being made available to external partners 2220f. That same proxy page may also be provided to staff 2220h within an external organization. Within the external partner's page 2220f, that document may be provided to another party (for example the Police 2220g and staff within the Police 2220i). It will also be appreciated that a document may be associated with an authorization level across a geographic location or different legal jurisdiction, but need not be, it could be any type of boundary classification, and what's visible to an authorized user in a particular geographic location or particular legal jurisdiction, may differ from that of a user authorized in another particular location or legal jurisdiction. For example, document 2220j may be a staff proxy page visible to staff in the US whereas proxy page 2220k may be a staff proxy page which is visible to staff who are resident in the state of California. This same page may be provided in another jurisdiction such as the UK as a staff proxy page as 2220l which may then differ from the same proxy page provided to US staff who are in Afghanistan for example as 2220m or staff in another jurisdiction of the US such as Utah 2220n.

Examples of authorization levels which include "horizontal" levels of authorization (in a ring-fencing sense) may be, for example, where:

government departments need to share the same document with different agencies, and they have a need to censor or redact each document differently according to different levels of authorization or ensure compliance with Interagency and Intergovernmental Information sharing regulatory guidelines.

a parole board, health providers, police, and the Correctional Governing body can be sharing the same document about the conduct of an inmate in their care, and sensitive information can be censored or redacted from each agency differently (ring-fenced), and according to different levels of authorization, whilst still maintaining a single record reference using this horizontal level of authorization. Prisoner's records often contain children's names, carers phone numbers, addresses, tax file numbers, driver's license details etc. . . . and this sensitive information can be censored or redacted if it has no relevance for the agency and where sharing all wording is unwise to minimize the risks of any legal retaliatory actions or divulging any sensitive Police intelligence.

government agencies like Liquor or Gaming licensing authorities that need to share documents between Consumer Affairs departments, Police and Local Council compliance officers, but need to redact and sensor sensitive information irrelevant to an agency, like the names of informants, victims or the suspect names, or insightful deliberations concerning the renewal of these licenses or financial details where detailed information is irrelevant to 3rd parties. Sensitive information can be censored or redacted (ring-fenced) from each different agency, according to different levels of authorization, whilst still maintaining a single record reference using this horizontal level of authorization.

a multinational energy corporation responsible for a major oil spill impacting different countries may need to share the same document with different people in different countries concerning compensation claims and ratification. These documents need to be censored and redacted according to the different legal jurisdictions that these documents are been served. This horizontal level of authorization means Privacy Act and Freedom of Information Act (FOIA) requirements can be enacted differently and according to different regions. Sensitive information in these documents can be censored or redacted (ring-fenced), for each country's legal jurisdiction, according to different levels of authorization, whilst still maintaining a single record reference using this horizontal level of authorization.

where educational institutions need to share the same student class reports, behavioral or health assessment documents with different government authorities, medical agencies, parents and guardians. These documents are protected by privacy laws and these documents can be censored or redacted differently according to different levels of authorization relevant for each party. Student records often contain names, phone numbers, addresses, medical details, etc. . . . . Where it is inadvisable that all words are shared with a party, this sensitive information can be censored or redacted if it has no relevance, whilst still maintaining a single record reference using this horizontal level of authorization.

Figure 23:
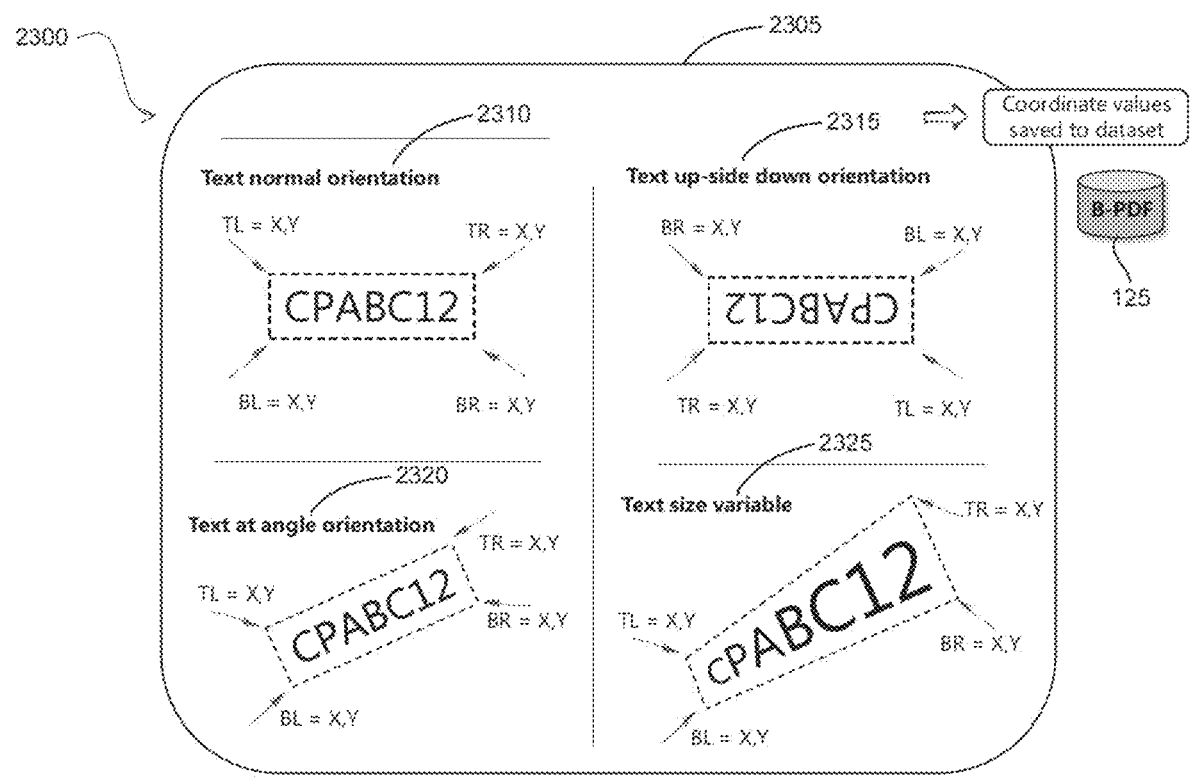
FIG. 23 is a schematic diagram illustrating the operation of vectors and block out polygons when automatic machine censorship is carried out.

FIG. 23 is a schematic diagram 2300 illustrating the operation of vectors and block out polygons when automatic machine censorship is carried out. As shown in 2305, character pattern matching may occur where text is oriented in normal orientation 2310 having coordinates xy for each of top left, top right, bottom left and bottom right or may be text upside down orientation 2315 or may be text at angle orientation 2320 or may be text size variable 2325 where the text is at an angle and varies in size. Once determined by the machine censorship, the coordinate values are saved as a dataset to the database 125 along with the page corner coordinates for example, page top left, page top right, page bottom left or page bottom right coordinates for use in the building of Machine-Layer-2' 1305 as a temporary raster in-memory page and displayed in an image viewer 2505 in FIG. 25 at a particular authorization level.

Figure 24:
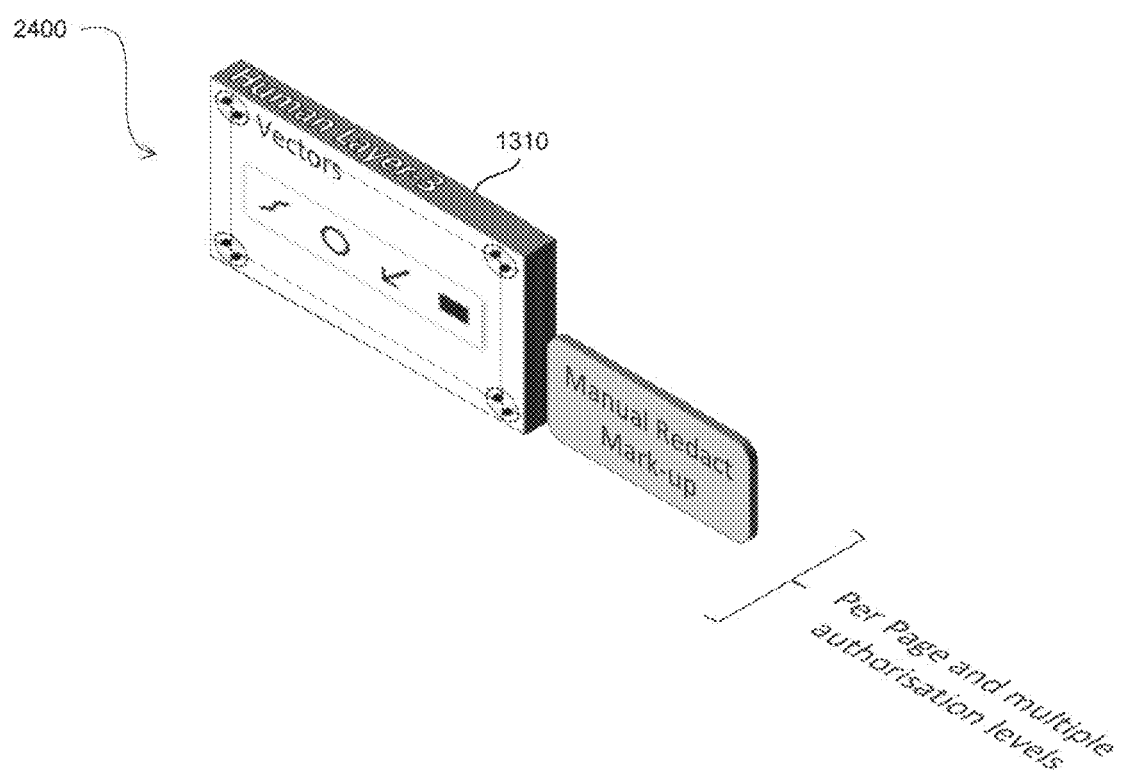
FIG. 24 is a schematic diagram of a human layer of manual redaction and mark-up.

FIG. 24 is a schematic diagram 2400 of a human layer of manual redaction and mark-up 1310 which can be carried out per page and from multiple authorization levels.

Figure 25:
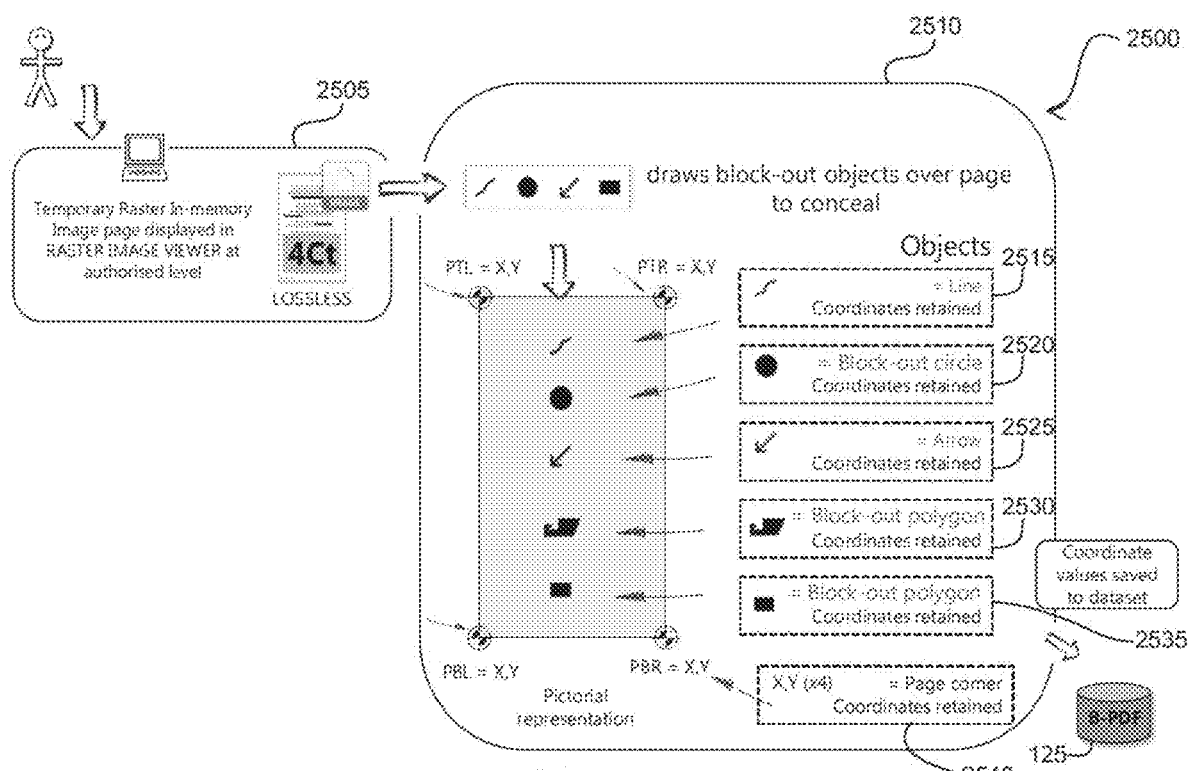
FIG. 25 is a schematic diagram illustrating the operation of human redaction.

FIG. 25 is a schematic diagram 2500 in the operation of human redaction shown as a temporary raster in-memory page 515 and is displayed in an image viewer at a particular authorization level 2505. As shown in 2510, the user (typically user associated with computer 115) may manually block out material in a particular page of the PDF record to an authorization level, through a number of tools such as line 2515, circle 2520, arrow 2525, block out polygon 2530 and block out rectangle 2535. In each case, page corner coordinates are retained at 2540. For example, page top left, page top right, page bottom left and page bottom right and each object particular coordinates. The coordinate values are then saved to a data set in database 125 for use in the building of 'Human Layer-3' 1310 as a temporary raster in-memory page and displayed in an image viewer at a particular authorization level 2505. Special case objects may also be provided in a different color, for example, red in which red may indicate a censorship alert such that if a particular page is viewed with a special case, further action may be taken such as an email being sent, two step verification and the like.

Figure 26:
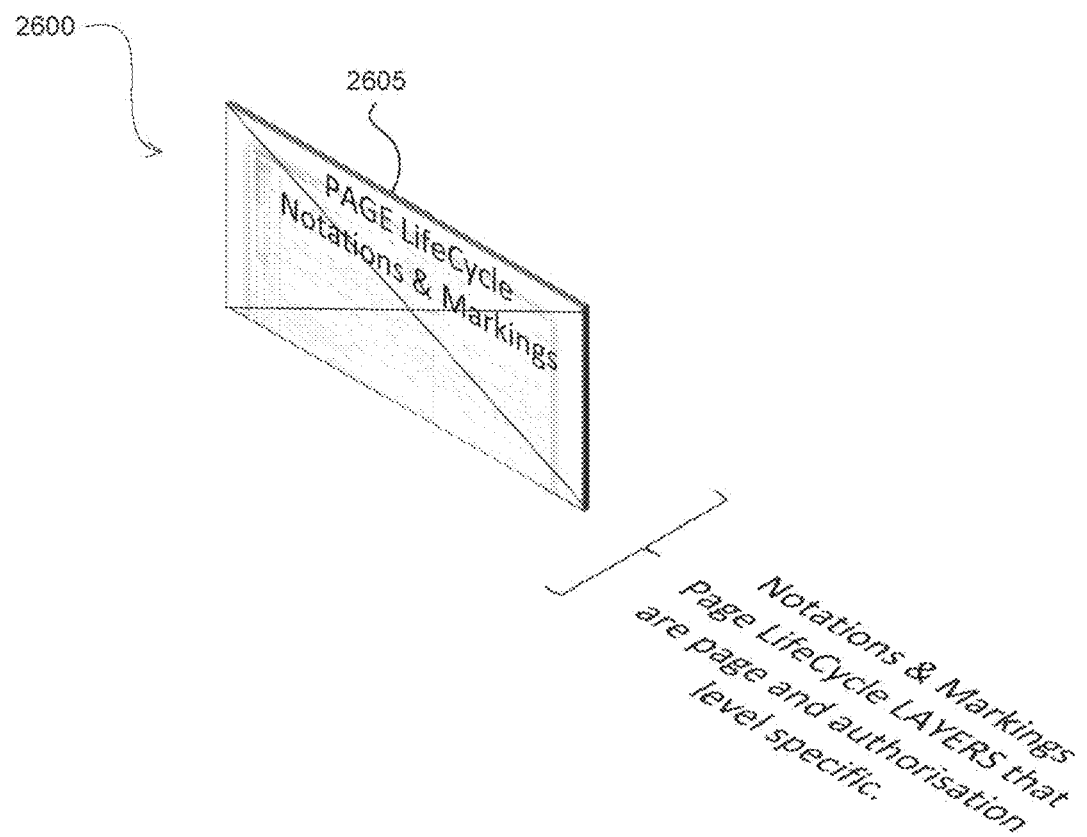
FIG. 26 is a schematic diagram illustrating page lifecycle notation and markings.

FIG. 26 is a schematic diagram 2600 of page lifecycle notation and markings 2605. Includes dynamic page notations that have clickable actions and color-coding. The lifecycle layers are 'notations and markings' that are page specific and authorization level specific.

Figure 27:
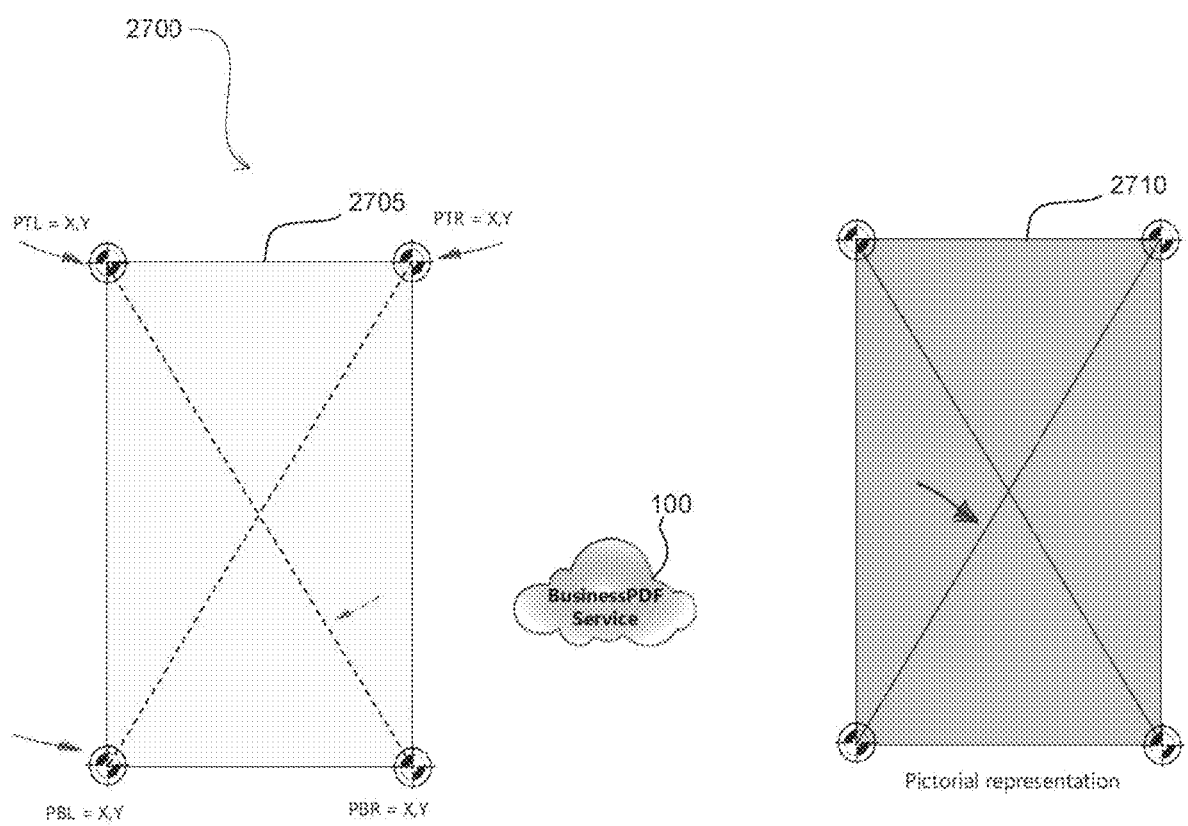
FIG. 27 is a further schematic diagram illustrating page lifecycle notation and markings.

As shown in FIG. 27 is a schematic diagram 2700 of a single PDF page that may appear crossed out, driven by censorship or lifecycle data set conditions based on authorization levels. As shown on page 2705, the system may connect a colored line between page top left (PTL) and page bottom right (PBR), page top right (PTR) and page bottom left (PBL). This line is dynamically overlaid at the time the page is viewed. The display 2710 shows a single page crossed out if the page is NOT CURRENT, CANCELLED, SUPERSEDED, RETIRED, OFF-LINE, for multiple authorization levels.

Figure 28:
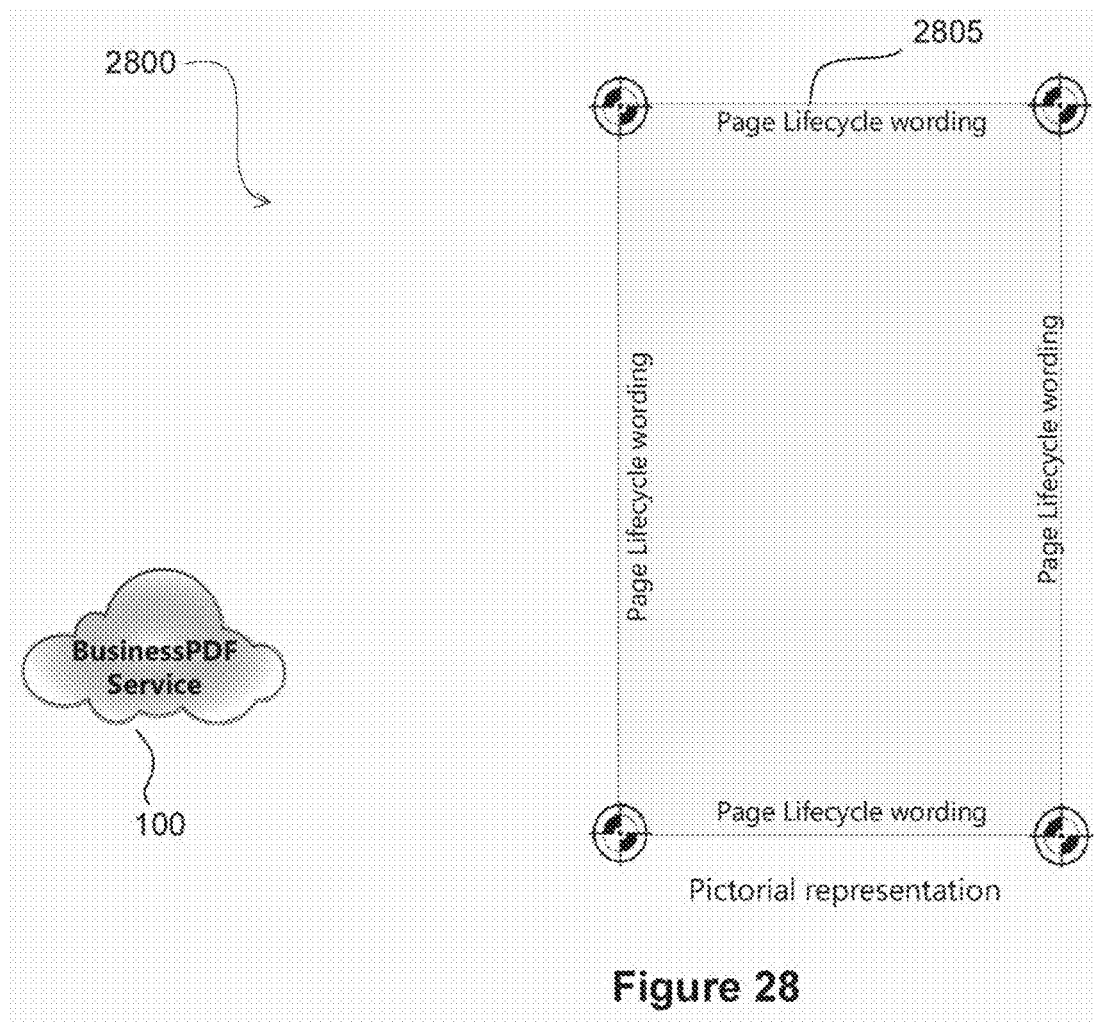
FIG. 28 is a schematic diagram illustrating the use of page notation based on authorization level which includes vector notations.

FIG. 28 is a schematic diagram 2800 illustrating the use of page notation based on authorization levels which includes vector notations that are clickable actions and are authorization level specific. For example, page 2805 includes page lifecycle wording and vector notations which may be clicked and if clicked are noted by the system 100 and a function is executed against a specific page at a particular authorization level. As described with reference to FIG. 7, page lifecycle marking and wording are used to provide indicia for the different statuses that a page may go through during its life, giving the reader context to the service of each page. For example this is used to show if the page is CURRENT, RETIRED, CANCELLED, SUPERSEDED, OFF-LINE at the time when the page is viewed or printed.

Figure 29:
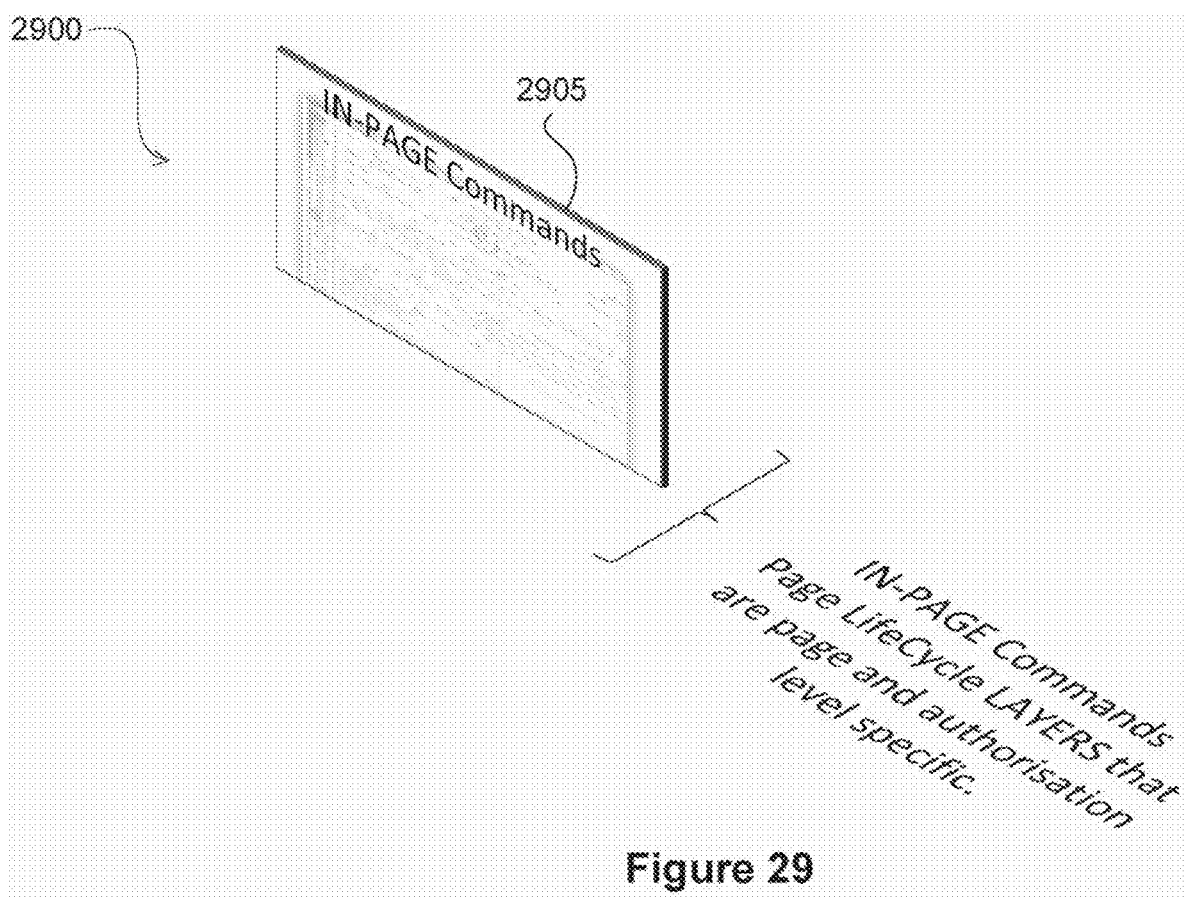
FIG. 29 is a schematic diagram of in-page commands.

FIG. 29 is a schematic diagram 2900 of in-page commands 2905 which includes dynamic page notations that include clickable actions and color-coding. Again, in-page commands may include layers at a page and authorization level specific.

Figure 30:
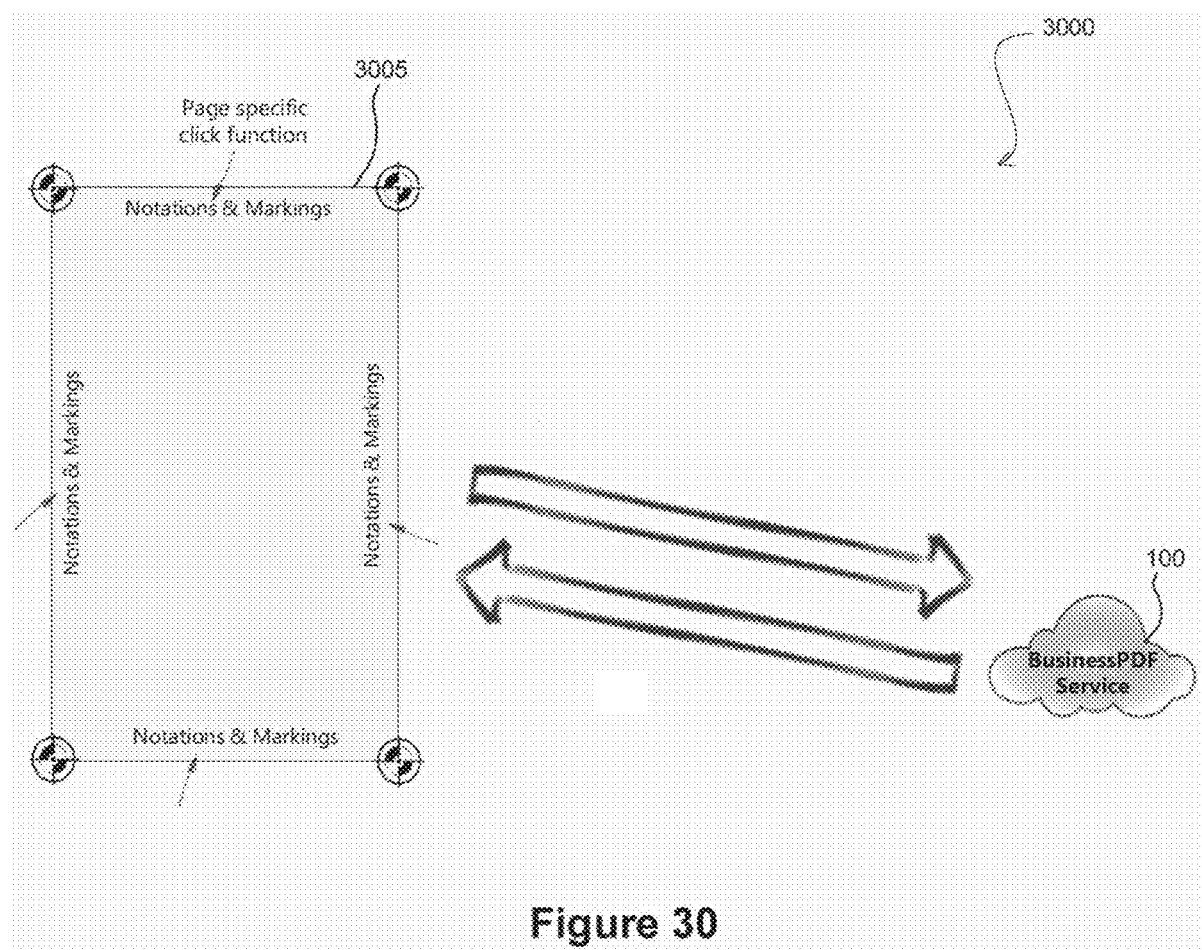
FIG. 30 is a further schematic diagram illustrating notations and marks and software functions that are page specific.

FIG. 30 shows schematic diagram 3000 illustrating a page 3005 which has notations and markings on a single PDF page and a software function that is page specific which can be applied to each notation or marking. When the notation is clicked, a function is executed against a specific page at a particular authorization level. Preferably the notations and markings are provided in blue such that it displays but does not print. For example, notations and marking functions may include: REDACT (to commence page redaction of the viewed page). REFRESH (to refresh the PDF from system 100 to ensure the latest publication is read), RETIRE (to retire the page), REMARK (to add a remark/comment in context to the page), LEFT (to rotate page permanently counter clockwise), RIGHT (to rotate page permanently clockwise), HIGH or LOW (switch page resolution), PAGE ADMIN (to commence page administration of the viewed page), ADDED (Time and Date Stamp when the page was added to the system) and EXTRACTED (when the page was obtained from the system 100).

Figure 31:
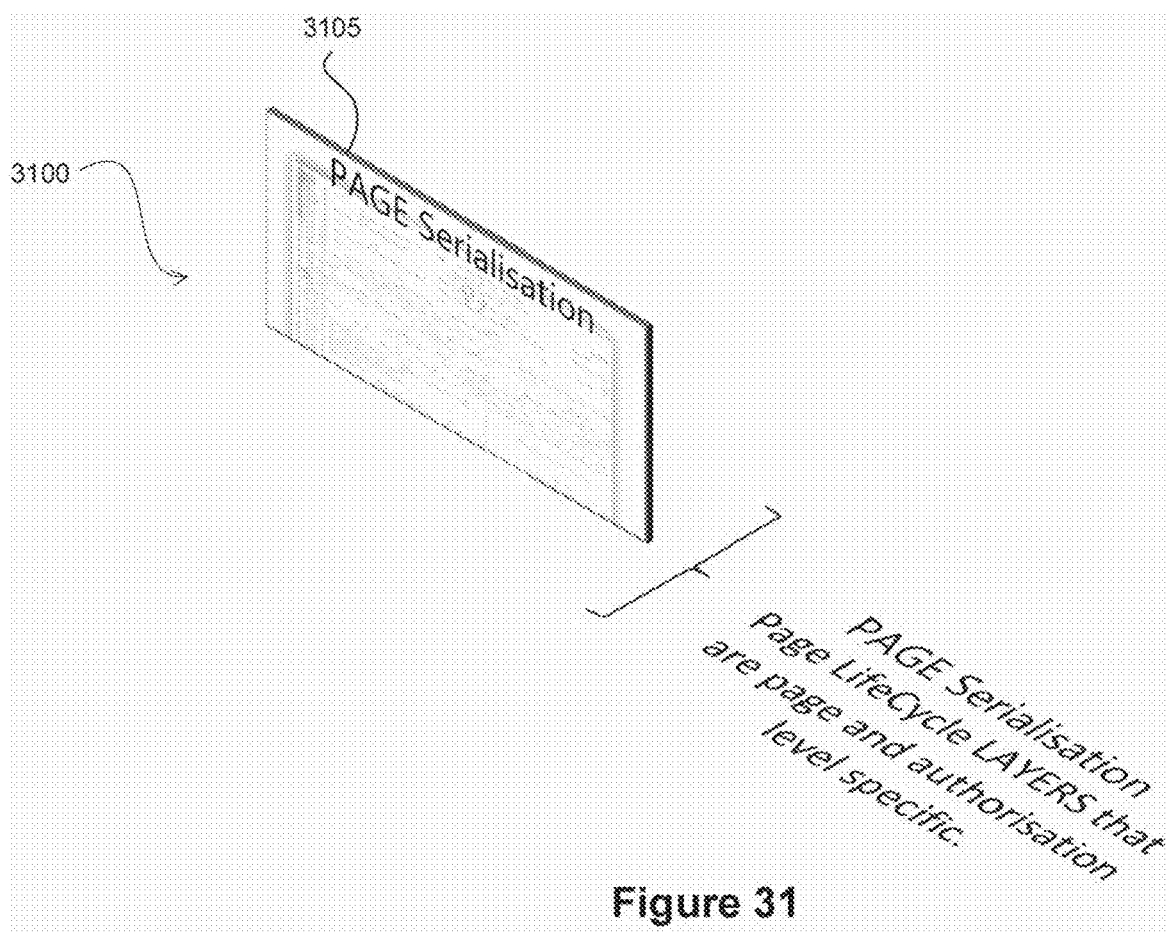
FIG. 31 is a schematic diagram illustrating page serialization.

FIG. 31 is a schematic diagram 3100 of a page serialization 3105 which again includes dynamic page notations that have clickable actions and color-coding. Again, coding and actions are page specific and authorization level specific.

Figure 32:
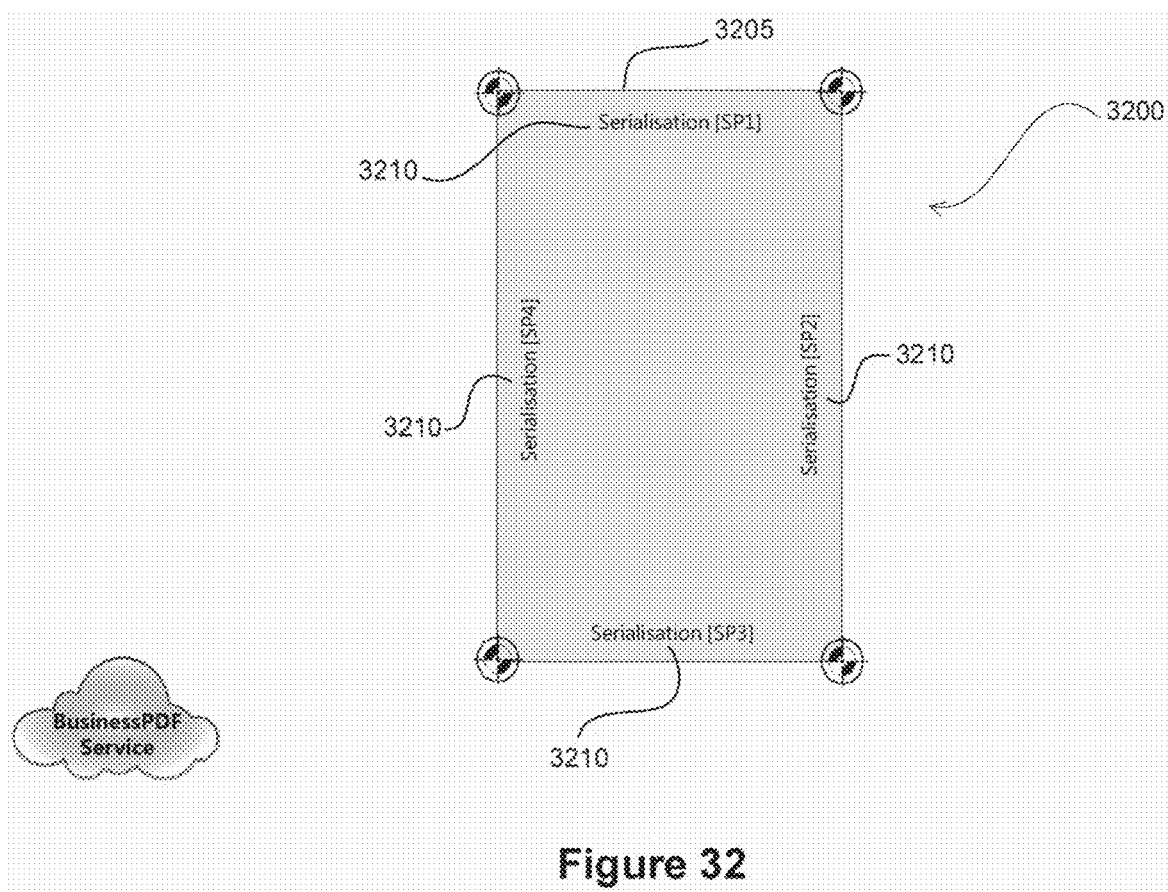
FIG. 32 is a schematic diagram of a page which includes serialization information.

As shown in FIG. 32, there is a schematic diagram 3200 including a sample page 3205 which includes serialization information. Serialization information can be used to audit the electronic or hardcopy page found, for example, on someone's desk. Serialization notation can be used to search electronically for an individual PDF page. The serialization code may be applied to each page which personalizes each PDF page. The serialization code may be made up of five unique elements namely a page identification, user identification, authorization level, date/time identification and transaction identification.

The Serialization identifier 3210 may be randomly applied at different margin positions to inhibit easy removal. Preferably the serialization and personalization graphics are displayed in green meaning that they are not displayed on screen but displayed when printed.

Figure 33:
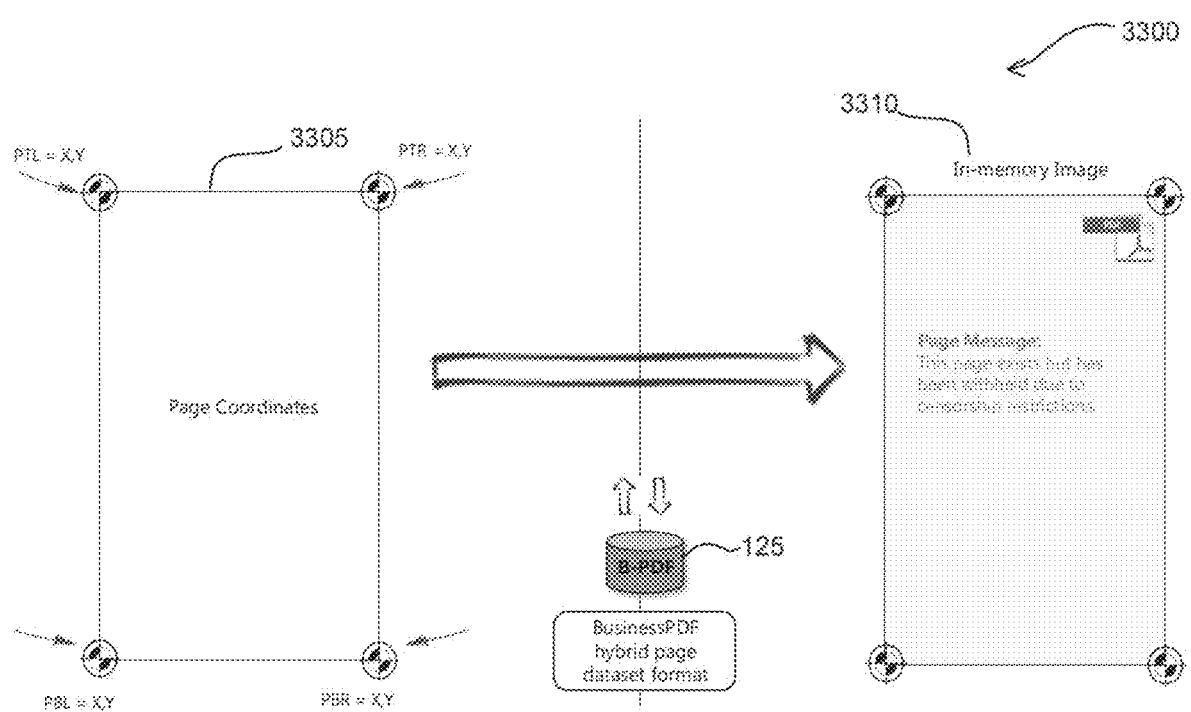
FIG. 33 is a schematic diagram of censorship of pages.

FIG. 33 illustrates a schematic diagram 3300 of censorship of a page including page 3305 which includes coordinates of page top left, page top right, page bottom left and page bottom right such that the coordinates are used to draw page object to the "in-memory image" page 3310 and add notation messages and stored in the database 125 such that the in-memory image 3310 which is served up to a user as either page object 530, 535 (depending on authorization level) where a message is shown to the user that the page exists but is being withheld due to censorship reasons.

Figure 34:
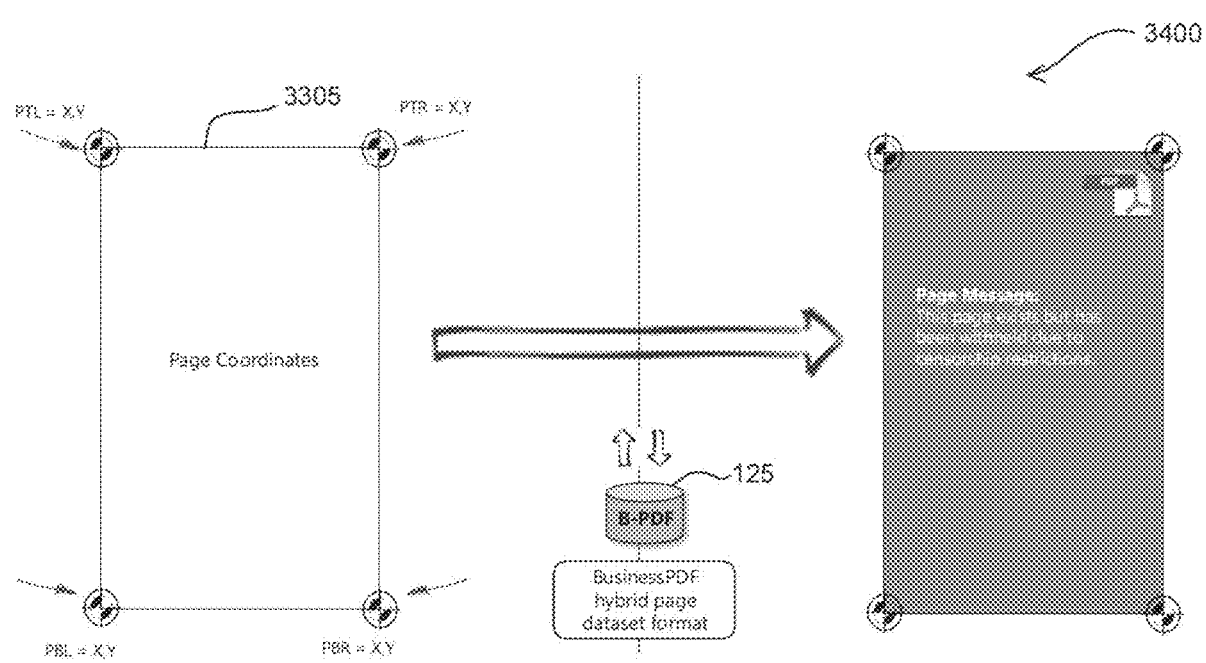
FIG. 34, is a further schematic diagram of censorship of pages.

As shown in FIG. 34, this may be extended to a special case which page 3305 is coordinated to draw a notation message to the "in-memory page" such that the censorship special case is recorded on the database 125 such that in the event any user accesses either page 530, 535 (depending on authorization level) further action may be taken such as an email sent to third party to advise that a particular page has been accessed or requires two step verification before display.

It will be appreciated that machine redacted information or manually redacted information may be distinguished between by a color or by a reference code. It will also be appreciated that each act of censoring a document includes a reference code and is recorded such that if a user is viewing a page they may be, depending on authorization level, see why or who or when a particular piece of content was censored or redacted such that they may be able to contact an appropriate person to have that removed or altered or called into question.

Figure 35:
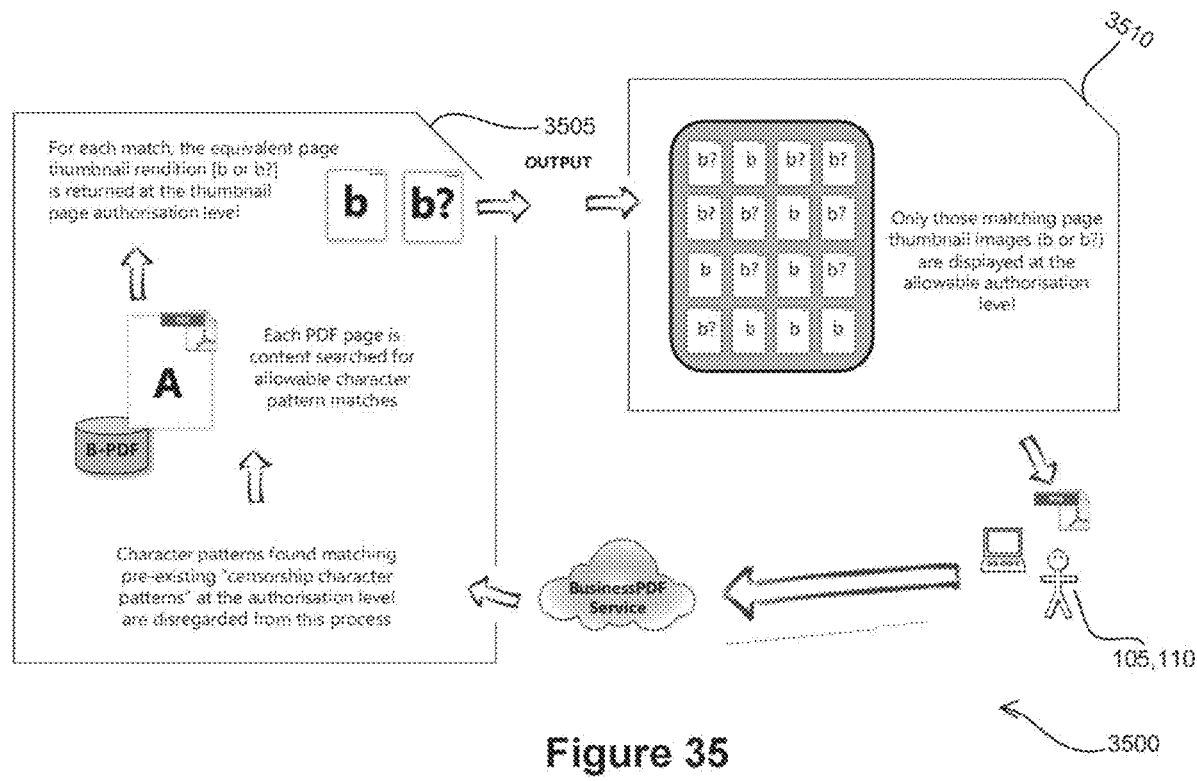
FIG. 35 is a schematic diagram illustrating searching for content within a PDF record.

FIG. 35 illustrates a schematic diagram 3500 of searching for content within any number of PDF file record schema denoted by 801A to 801n in which a user via computer 105, 110 via a URL call to search all PDF content via character pattern, e.g., word or phrase. The system 100 and the server 120 and database 125 carries out a search function 3505. Character patterns found matching pre-existing "censorship character patterns" at that particular authorization of the user are disregarded. Then each PDF page 420 object content is searched for allowable character pattern matches and for each match an equivalent page thumbnail rendition 425 or 540 is returned to the user at a particular authorization level as shown in 3510. In 3510 only those matching thumbnail images at the allowable authorization level are displayed so that some thumbnail images may not display any pictorial or visual content. The thumbnail image can be click to access the full resolution PDF document opened at the equivalent thumbnail page position and appropriate for a given authorization level.

Figure 36:
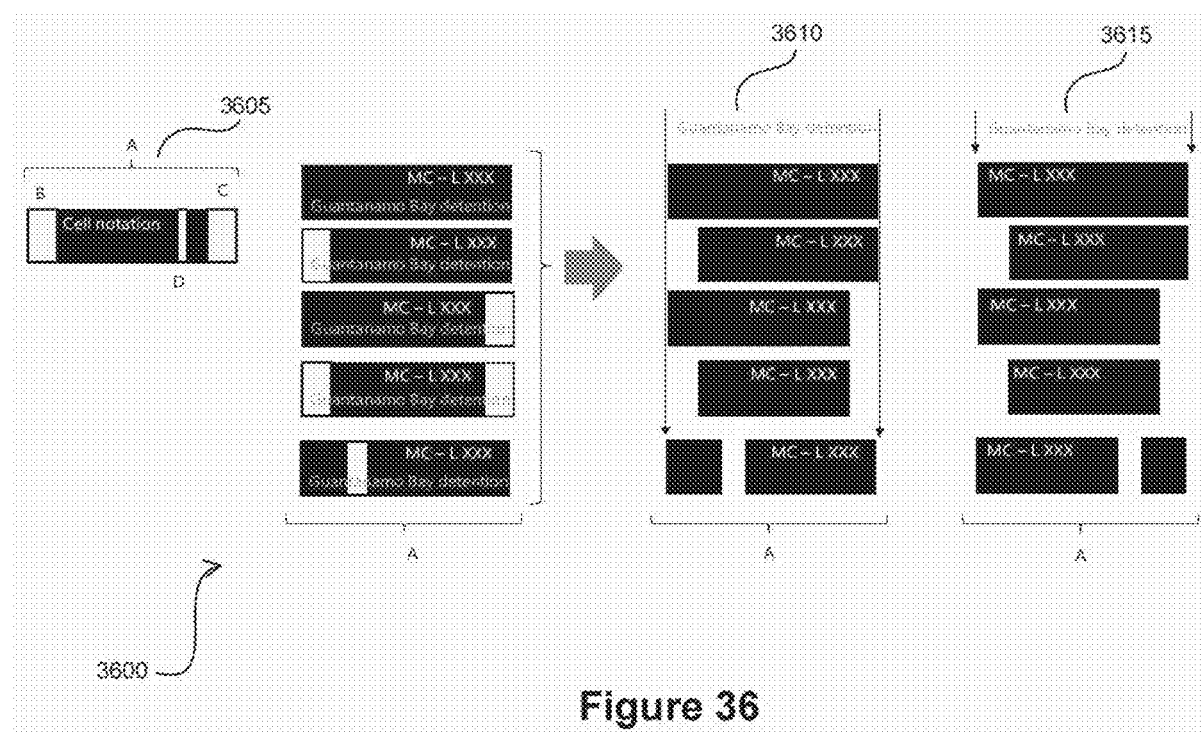
FIG. 36 illustrates a schematic diagram of the system randomly "striping" content within a PDF record.

FIG. 36 illustrates a schematic diagram 3600 of the system randomly "striping" redacted or censored content displayed in a PDF record in which a user via computer 105, 110 via a URL call displays a PDF record. It will be appreciated that machine or human redacted information thought to be redacted in some cases, that the meaning of a redacted word can be successfully recovered via a combination of manual effort and document image analysis techniques. By randomly varying the shape of the redaction cell when the same redacted phrase is encountered, it will visually obfuscate the widths of the missing phrase below the redaction, reducing the effectiveness of these modelling techniques. For example, in the case of a word XXXX representing, for example Guantanamo Bay detention, that particular phrase has a particular length which may be able to be determined by combination of manual effort and document image analysis. The system 100 of the present invention provides a cell notation arrangement 3605 in which a fixed dimension of the word is provided by (a) which in this example is XXXX and may be the word Guantanamo Bay detention. If nothing was amended to this redacted text, the length and dimension of the phrase would be constant. The system further includes random redaction cell striping. This arrangement maybe applied randomly to each instance of any phrase, in this case, Guantanamo Bay detention. Shown in 3610 and 3615 are random results of applying 3605 to the redacted phrase. Each redacted phrase may be tagged for example MC (Machine Censorship), HC (Human Censorship, LXXX (Level authorization XXX). In the first instance, the entire phrase is blocked out. In the second instance, a portion of the left hand side of the word is "striped" below. Also shown is the phrase "striped" on the right hand side, the phrase is "striped" at both the left and right hand side and, finally, the phrase maybe "striped" in the middle of the phrase. Advantageously, this creates the illusion that the word or phrase is longer or shorter than is actually the case or maybe contain two or more words. The result of applying the striping is shown in 3610, 3615, in which the same phrase is redacted but the various redactions are "striped" to create the illusion to the eye and to the document image analysis 'hacker' that there are different phrases that are redacted, when in fact it is in this case the same phrase.

Figure 37:
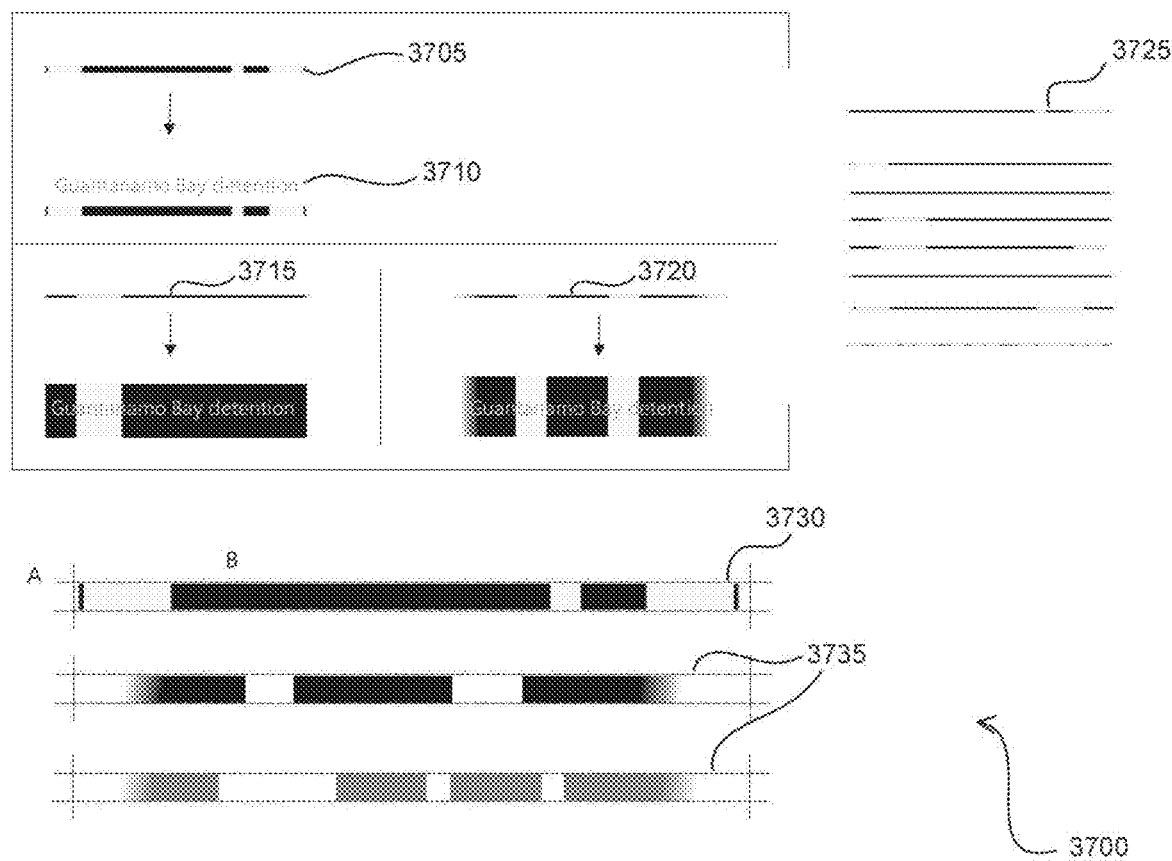
FIG. 37 illustrates a schematic diagram of the system randomly "striping" content within a PDF record.

FIG. 37 illustrates a schematic diagram 3700 of the system randomly "striping" redacted or censored content displayed in a PDF record in which a user via computer 105, 110 via a URL call displays a PDF record. Redacted cell striping and obfuscation is achieved by randomly selecting from a pool of redacted cell images 3725 that are pixelated. The pixelated redaction cell image is a minimum of one pixel in height, and is a variable length and may be solid colored 3730 (black and white or another color) gradient scaled 3735. The amount of pixelated redacted cell images within the pool 3725 and the variation in the pixilated design of each redacted cell image will vary the cell obfuscation effect as shown in 3705, 3710, 3715 and 3720. The pixelated cell image is scaled to fill the redacted area, creating the impression of random striping.

Figure 38:
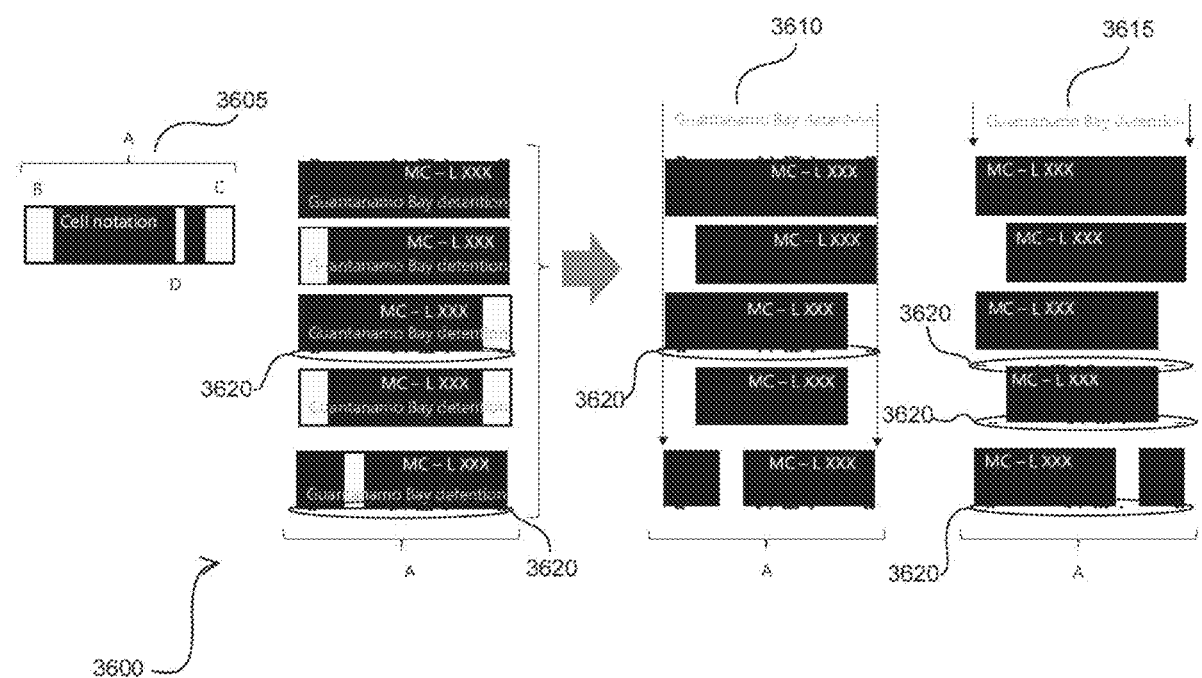
FIG. 38 illustrates a further schematic diagram of the system randomly "striping" content within a PDF record.

FIG. 38 is a further view of FIG. 36 including randomly "striping" redacted or censored content but applying the arrangement described with reference to FIG. 39 in which cell obfuscation 3620 is applied.

Figure 39:
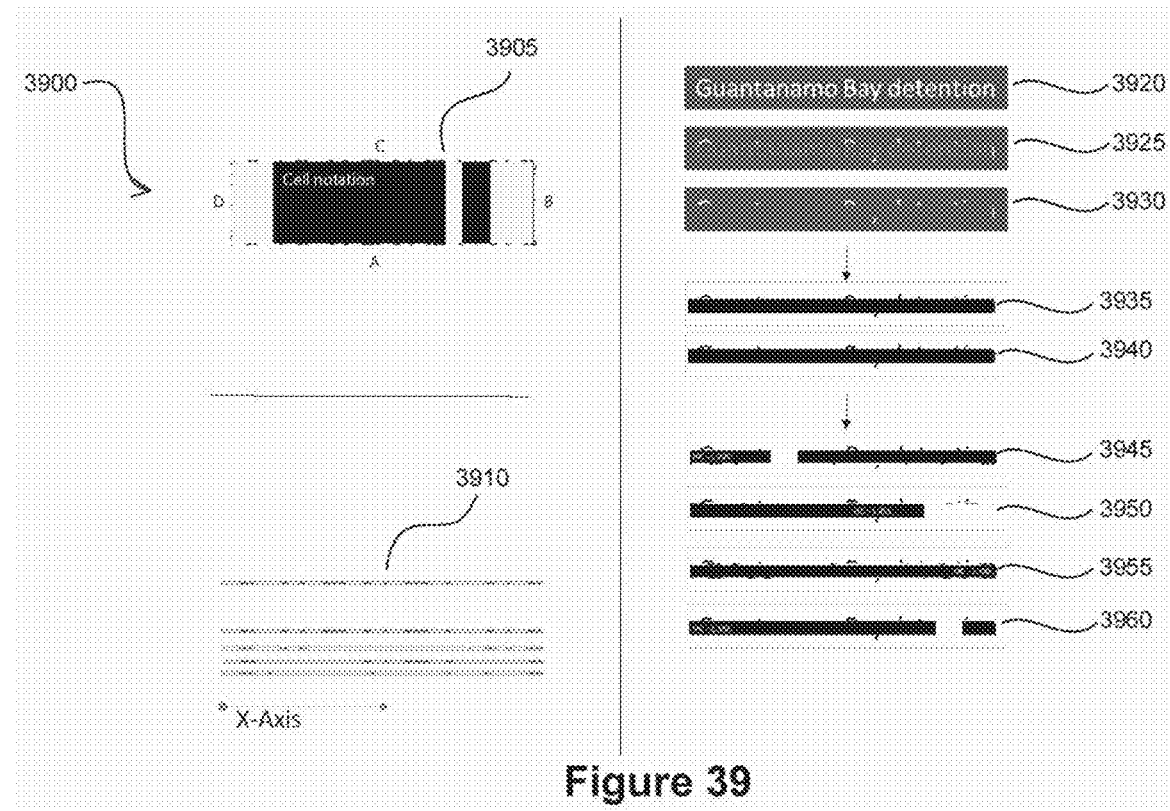
FIG. 39 is a further view of the schematic diagram of FIG. 36 in which the system randomly "stripes" content within a PDF record.

FIG. 39 is a schematic diagram 3900 illustrating boundary cell obfuscation. It will be appreciated that there may be other features available to the document image analysis 'hacker' besides the width of the word to successfully recover the meanings of a redacted word. People may use character ascenders, descenders, or i-dots that have not been obscured in the redaction process. An ascender is the part of a letter that is higher than the words height. A descender is the part of a letter that is lower than the word. Ascenders and descenders combined, increase the readability of redacted words. Noticing the presence of these features and their approximate position within the redaction can materially help to reveal the hidden meaning below.

By creating the illusion that these word ascenders or descenders maybe or may not be present when the same redacted phrase is encountered will obfuscate the phrase. It also aids to obfuscate ascenders or descenders that remain visible after the redaction process. This acts as an effective countermeasure to reduce the readability of redacted words and phrases.

Ascender or descender obfuscation is achieved by randomly selecting from a pool of ascender/descender image cells that are pixelated. The amount of image cells within the pool and the variation in the ascender/descender pixilated design of each image cell will varied the obfuscation effect. A image cell is a minimum of one pixel height, and is a variable length. An image cell can be placed on each redact cell boundary edge randomly, been top, bottom, left or right, or a combination of all four, or no image is placed. Each image is scaled along the images X axis only, to fit within the redaction frame boundary dimension, creating the illusion to obfuscate ascender or descender markings. For example in the obfuscation of cell 3905, it may be applied along side A, along side B, along side C, along side D or a combination of these or none of these. A pool of ascender/descender obfuscation cells 3910 may be provided which are drawn from randomly.

Example of cell obfuscation and the redacted phrase 3920. Cell image 3925 is a blended image example showing the faded phrase 3920, while the ascender and descender remain obvious. Cell image 3930 shows the remaining ascender and descender which can be used to help reveal the hidden meaning of the redacted phrase below 3935, 3940.

As shown in 3945, 3950, 3955 and 3960 are various examples of obfuscation in the form of a combination of striping, ascenders/descenders and redaction geometry applied to further strengthen the obfuscation of the text.

Figure 40:
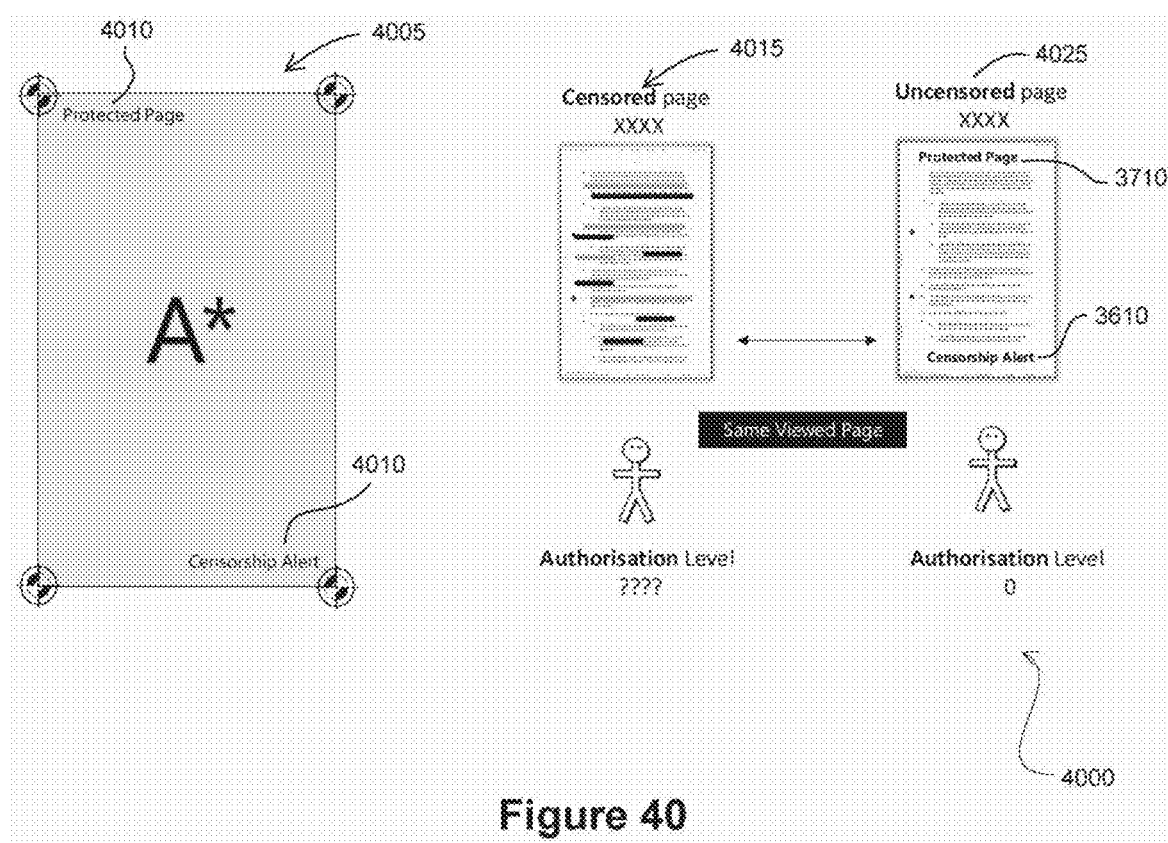
FIG. 40 illustrates a schematic diagram in which a page specific censorship alert function is provided.

FIG. 40 illustrates a schematic diagram 4000 in which a page specific censorship alert function is provided. A censorship alert function is preferably provided for each PDF page 4005 which is censored. An alert message or indicia 4010 may be provided on the page to alert a viewer who is viewing an uncensored version of the page 4025 that the particular page they are viewing is censored for other users at other authorization levels 4015. This will not be obvious at a higher authorization level, as all redaction mark-ups maybe intentionally omitted from a page, removing any visual clue as to the privilege nature of the page. This effectively alerts the viewer of the page 4025 who is viewing it in an uncensored format that the page is protected and censored. Presently, systems cannot automatically distinguish between censored and uncensored pages from the point of view of a person at a higher level viewing the uncensored PDF documents, and potentially not realizing that the PDF document they have is censored to other people and therefore should not be disclosed. The present invention eliminates the risk of unintentional disclosure by providing a censored page 4015 and an uncensored page 4025 which serves to alert the viewer of the uncensored page 4025 that a version of the page they are viewing is censored to some users and therefore care should be taken when printing or circulating that particular page.

The invention claimed is:

1. A computer implemented method comprising:
   generating a file record associated with an electronic document, the electronic document having one or more pages;
   detaching each of the one or more pages of the electronic document and generating one or more page records within the file record, wherein each page record corresponds to a different one of the one or more pages of the electronic document;
   for each page with redacted content, generating, using an image format, one or more redacted page image records, such that each redacted page image record retains a visual appearance of and remains indistinguishable from the corresponding page record, each redacted page image record having an associated authorization level, and wherein each of the one or more page records and each of the one or more redacted page image records is pre-computed and stored in a database, such that even very large files having many redactions are selectively compiled very quickly and displayed collaboratively near-instantly according to any number of authorization levels, wherein heavily redacted document record and the same document record without redactions is displayed at approximately same speed, since all the pages are stored in a pre-computed mode;
   in response to a request from a first user, assembling a first combination by selecting from the one or more pre-computed page records and the one or more pre-computed redacted page image records, and displaying the first combination to the first user, wherein the authorization level associated with each selected redacted page image record assembled into the first combination corresponds to a first authorization level associated with the first user, and wherein each selected redacted page image record of the first combination is presented with the redacted content removed; and
   in response to another request from a second user, assembling a second combination by selecting from the one or more pre-computed page records and the one or more pre-computed redacted page image records, and displaying the second combination to the second user, wherein the authorization level associated with each displayed redacted page image record assembled into the second combination corresponds to a second authorization level associated with the second user that is different than the first authorization level associated with the first user, wherein each displayed redacted page image record of the second combination is presented with the redacted content removed, and wherein displaying of the first combination and the second combination is in a collaborative near-real time dynamic manner, such that the first user and the second user view the same electronic document having different redacted content removed.

2. The computer implemented method of claim 1, wherein the one or more page records and one or more redacted page image records are retrieved and displayed dynamically in response to a Uniform Resource Locator (URL).

3. The computer implemented method of claim 2, wherein the authorization level associated with a user viewing the electronic document is initiated by the URL.

4. The computer implemented method of claim 2, wherein the authorization level associated with a user viewing the electronic document is determined in response to a login.

5. The computer implemented method of claim 1, wherein the authorization level associated with a user viewing the electronic document is determined via an identity manager module.

6. The computer implemented method of claim 1, wherein the redacted content is stored in a database based at an authorization level associated with a page record.

7. The computer implemented method of claim 1, wherein each of the one or more redacted page image records includes a high resolution copy and a low resolution copy of the redacted page image records to display.

8. The computer implemented method of claim 1, further including the step of providing a thumbnail image of each redacted page image record and each page record, the thumbnail being associated with an authorization level.

9. The computer implemented method of claim 8, wherein each of the page record thumbnail images and the one or more redacted page image record thumbnail images are pre-computed and stored on a database.

10. The computer implemented method of claim 9, wherein each thumbnail image is associated with a Universal Resource Locator (URL) which points to a full resolution version of the page and is associated with an authorization level.

11. The computer implemented method of claim 1, further including the step of accessing the database and selectively displaying the page record thumbnail image and the one or more redacted page image record thumbnail images based on the authorization level associated with a user.

12. The computer implemented method of claim 1, further including the step of selectively displaying the thumbnail image of each redacted page image record based on the authorization level associated with a user viewing the electronic document.

13. The computer implemented method of claim 1, further including the step of providing overlay data on the one or more page records and the one or more redacted page image records.

14. The computer implemented method of claim 1, further including the step of providing overlay data in real-time on the one or more page records and the one or more redacted page image records being associated with an authorization level.

15. The computer implemented method of claim 8, wherein the overlay data includes, a notification of currency of the page record or page record image, one or more indicia for visible for display on a screen, one or more indicia visible for printing, one or more indicia visible for display on a screen and printing page censorship alerts or page substitution alerts.

16. The computer implemented method of claim 12, wherein the overlay data includes, a censorship alerts indicia on the page record or on the one or more redacted page image records.

17. The computer implemented method of claim 12, further including the step of providing a notification of currency indicia on the page record or on the one or more redacted page image records.

18. The computer implemented method of claim 12, further including the step of providing, one or more indicia for visible for display on a screen, one or more indicia visible for printing, one or more indicia visible for display on a screen and printing.

19. The computer implemented method of claim 12, further including the step of providing serialization and personalization indicia on the page record or on the one or more redacted page image records.

20. The computer implemented method of claim 1, further including the step of providing page substitutions of the page record or of the one or more redacted page image records.

21. The computer implemented method of claim 12, wherein the overlay data is stored in a database, based on the authorization level associated with a page record.

22. The computer implemented method of claim 1, further including the step of applying an optical character recognition (OCR) process on one or more page records and one or more redacted page image records.

23. The computer implemented method of claim 1, wherein content within a page image record is redacted and a striping arrangement is provided on the redacted page image record.

24. The computer implemented method of claim 1, wherein content within a page image record is redacted and a boundary cell obfuscation arrangement is provided on the redacted page image record.

25. The computer implemented method of claim 24, further including the step of modifying the boundary cell obfuscation arrangement provided on the redacted page image record.

26. The computer implemented method of claim 1, wherein content within a page image record is redacted or permission is granted or denied to the original source file object(s) is regulated based on the redaction authorization level set within the entire document.

* * * * *